(12) United States Patent
Shin et al.

(10) Patent No.: US 12,495,687 B2
(45) Date of Patent: Dec. 9, 2025

(54) TOUCH DRIVING CIRCUIT AND TOUCH DISPLAY DEVICE

(71) Applicant: LG DISPLAY CO., LTD, Seoul (KR)

(72) Inventors: SeungRok Shin, Paju-si (KR); Sangkyu Kim, Paju-si (KR); Jeonghoon Lee, Paju-si (KR); DeukSu Lee, Seoul (KR); Yoonnara Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 442 days.

(21) Appl. No.: 18/305,945

(22) Filed: Apr. 24, 2023

(65) Prior Publication Data

US 2024/0049534 A1    Feb. 8, 2024

(30) Foreign Application Priority Data

Aug. 5, 2022    (KR) .................... 10-2022-0098188

(51) Int. Cl.
*H10K 59/131*    (2023.01)
*H10K 59/40*    (2023.01)
*H10K 59/80*    (2023.01)

(52) U.S. Cl.
CPC .......... *H10K 59/131* (2023.02); *H10K 59/40* (2023.02); *H10K 59/873* (2023.02)

(58) Field of Classification Search
None
See application file for complete search history.

(56) References Cited

U.S. PATENT DOCUMENTS

2018/0095566 A1*    4/2018    Lee .................. H10K 59/40

* cited by examiner

*Primary Examiner* — Kyoung Lee
(74) *Attorney, Agent, or Firm* — Fenwick & West LLP

(57) ABSTRACT

A touch display device is disclosed that divides an active area into a reference touch area and a non-reference touch area and independently drives touch electrode lines positioned in the reference touch area and touch electrode lines positioned in the non-reference touch area. Touch sensing performance is enhanced while preventing or reducing signal distortion due to a difference in unit touch sensors in the reference touch area and the non-reference touch area.

27 Claims, 12 Drawing Sheets

TOUCH DRIVING CIRCUIT AND TOUCH DISPLAY DEVICE

CROSS-REFERENCE TO RELATED APPLICATION

This application claims priority from Republic of Korea Patent Application No. 10-2022-0098188, filed on Aug. 5, 2022, which is hereby incorporated by reference in its entirety.

BACKGROUND

Field

Embodiments of the disclosure relate to a touch driving circuit and a touch display device.

Description of Related Art

A display device may include a plurality of touch electrodes included in a display panel. The display device may drive a plurality of touch electrodes and recognize a user's touch on the display panel. The display device may provide a function of performing input processing based on the recognized touch.

Depending on the area of the display panel, distortion of the signal detected by a touch electrode disposed in the corresponding area may occur. Distortion of the signal detected by the touch electrode may reduce the accuracy of touch sensing.

SUMMARY

Embodiments of the disclosure may provide a method for preventing or at least reducing distortion of a signal detected from a touch electrode disposed on a display panel and degradation of accuracy of touch sensing due to distortion of the signal.

In one embodiment, a touch display device comprises: a substrate including an active area and a non-active area positioned outside the active area, the active area including a reference touch area and a non-reference touch area; a plurality of light emitting elements on the substrate; an encapsulation layer on the plurality of light emitting elements; a plurality of touch driving electrode lines on the encapsulation layer, the plurality of touch driving electrode lines including two or more touch driving electrodes electrically connected along a first direction; and a plurality of touch sensing electrode lines on the encapsulation layer, the plurality of touch sensing electrode lines including two or more touch sensing electrodes electrically connected along a second direction that crosses the first direction, wherein unit touch sensors are defined by intersections of the plurality of touch driving electrode lines and the plurality of touch sensing electrode lines, wherein a size of a unit touch sensor in the reference touch area is different from a size of a unit touch sensor in the non-reference touch area, and wherein at least one of a driving scheme for the plurality of touch driving electrode lines in the non-reference touch area is different from a driving scheme for the plurality of touch driving electrode lines including a portion in the reference touch area, or a sensing scheme for the plurality of touch sensing electrode lines in the non-reference touch area is different from a sensing scheme for the plurality of touch sensing electrode lines including a portion in the reference touch area.

In one embodiment, a touch driving circuit comprises: a first driving unit configured to simultaneously supply a touch driving signal to two or more first touch driving electrode lines from a plurality of first touch driving electrode lines during a first time period, a portion of the plurality of first touch driving electrode lines in a first area of a display panel; and a second driving unit configured to supply a touch driving signal to a plurality of second touch driving electrode lines that are in a second area of the display panel but not the first area where the second area is around the first area, the touch driving signal supplied to the plurality of second touch driving electrode lines during a second time period that is different from the first time period, wherein at least one of the plurality of first touch driving electrode lines in the first area is between the plurality of second touch driving electrode lines in the second area.

In one embodiment, a touch display device comprises: a display panel including: a substrate comprising an active area and a non-active area around the active area, the active area having a first area and a second area around the first area; a plurality of light emitting elements on the active area of the substrate; a plurality of first touch driving electrode lines in the first area and the second area, the plurality of first touch driving electrode lines extending along a first direction; and a plurality of second touch driving electrode lines in the second area but not the first area, the plurality of second touch driving electrode lines extending along the first direction; and a touch driving circuit configured to supply first touch driving signals to the plurality of first touch driving electrode lines during a first time period and supply second touch driving signals to the plurality of second touch driving electrode lines during a second time period that is non-overlapping with the first time period.

According to an embodiments of the disclosure, it is possible to reduce or prevent distortion of a signal detected from a touch electrode disposed on a display panel and enhance the accuracy of touch sensing.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
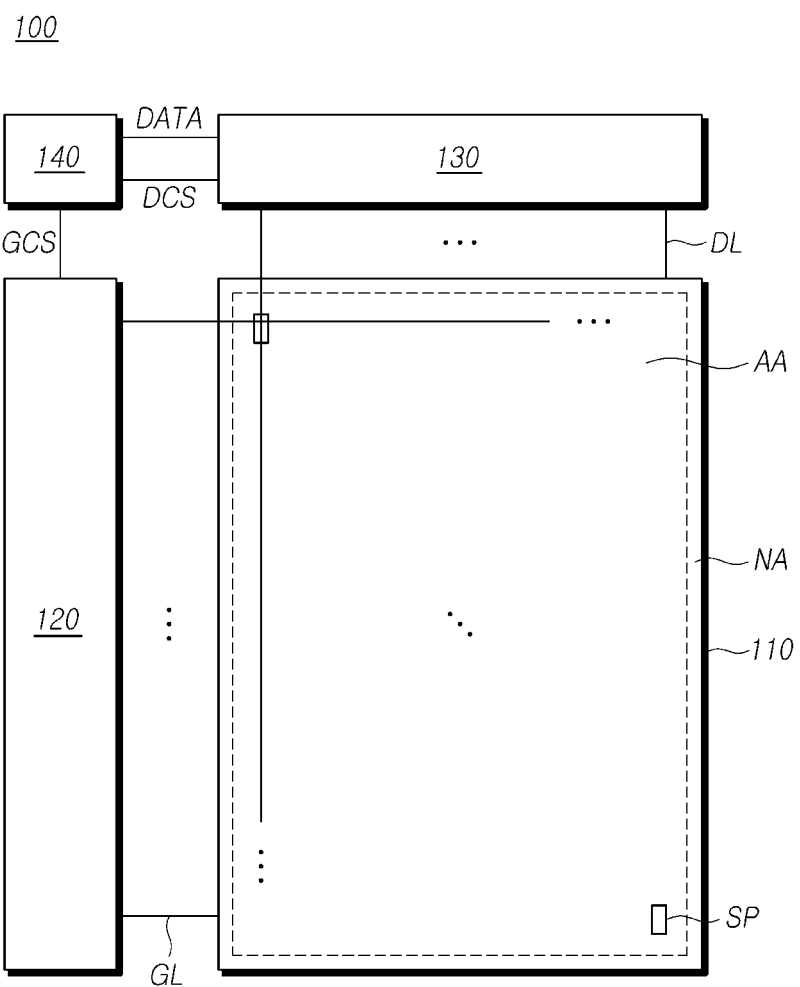
FIG. 1 is a view schematically illustrating a configuration of a touch display device according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 2:
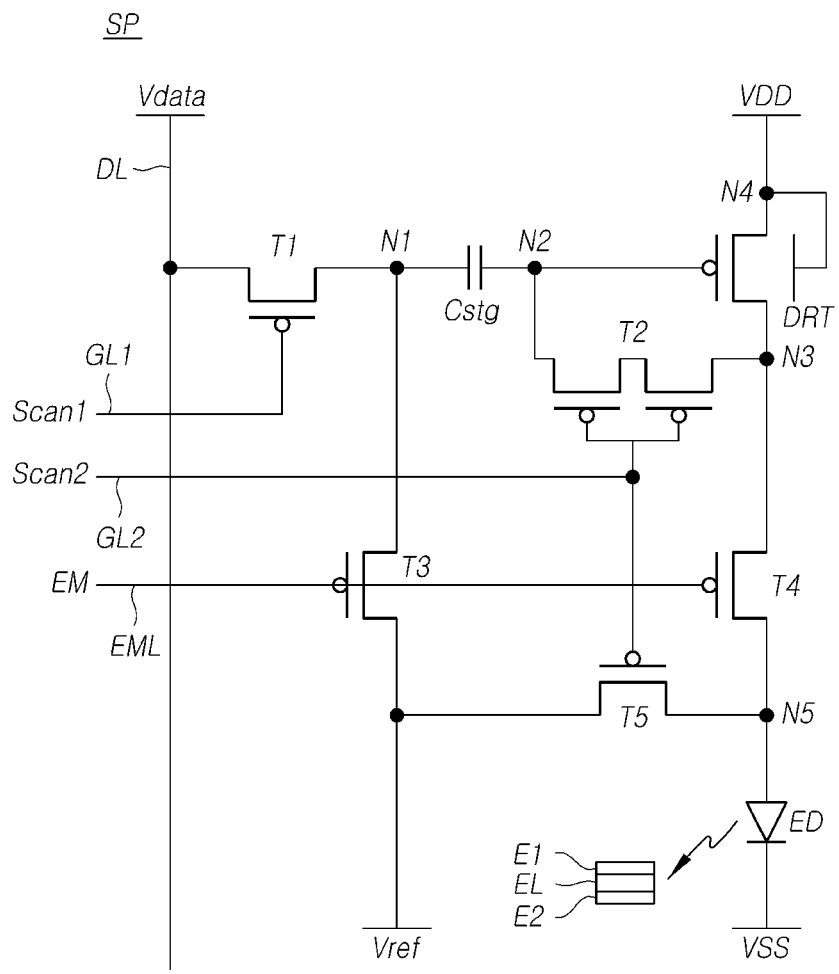
FIG. 2 is a view illustrating an example circuit structure of a subpixel included in a touch display device according to embodiments of the disclosure.

FIG. 1 is a view schematically illustrating a configuration of a touch display device 100 according to embodiments of the disclosure. FIG. 2 is a view illustrating an example circuit structure of a subpixel SP included in a touch display device 100 according to embodiments of the disclosure.

Referring to FIGS. 1 and 2, a touch display device 100 may include a display panel 110, a gate driving circuit 120 for driving the display panel 110, a data driving circuit 130, and a controller 140.

The touch display device 100 may further include a component for touch sensing in addition to a component for driving the display.

The display panel 110 may include an active area AA in which a plurality of subpixels SP are disposed and a non-active area NA positioned outside the active area AA. A plurality of gate lines GL and a plurality of data lines DL may be disposed on the display panel 110. The plurality of subpixels SP may be positioned in areas where the gate lines GL and the data lines DL intersect.

The gate driving circuit 120 may be controlled by the controller 140. The gate driving circuit 120 sequentially outputs scan signals to a plurality of gate lines GL disposed on the display panel 110 and may control driving timings of the plurality of subpixels SP.

The gate driving circuit 120 may include one or more gate driver integrated circuits (GDIC). The gate driving circuit 120 may be located only on one side of the display panel 110 or on each of two opposite sides according to driving methods.

Each gate driver integrated circuit GDIC may be connected to a bonding pad of the display panel 110 using a tape automated bonding (TAB) method or a chip on glass (COG) method. Alternatively, each gate driver integrated circuit GDIC may be implemented in a gate in panel (GIP) type and be disposed directly on the display panel 110. Alternatively, each gate driver integrated circuit GDIC may be integrated and disposed on the display panel 110. Each gate driver integrated circuit (GDIC) may also be implemented in a chip-on-film (COF) scheme to be mounted on a film connected to the display panel 110.

The data driving circuit 130 may receive image data DATA from the controller 140 and convert the image data DATA into an analog data voltage Vdata. The data driving circuit 130 may output the data voltage Vdata to each data line DL according to the timing of application of a scan signal through the gate line GL, so that each subpixel SP expresses a brightness according to the image data.

The data driving circuit 130 may include one or more source driver integrated circuits (SDICs). Each source driver integrated circuit (SDIC) may include, e.g., shift registers, latch circuits, digital-analog converters, and output buffers. The data driving circuit 130 may be positioned on only one side of the display panel 110 and may be positioned on each of two opposite sides.

Each source driver integrated circuit SDIC may be connected to a bonding pad of the display panel 110 using a tape automated bonding (TAB) method or a chip on glass (COG) method. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the driving of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to the timing set in each frame. The controller 140 may convert the image data received from the outside (e.g., a host system) according to a data signal format used by the data driving circuit 130 and output the converted image data DATA to the data driving circuit 130.

The controller 140 may receive, from outside (e.g., host system) the display device 100, various timing signals including a vertical synchronization signal VSYNC, a horizontal synchronization signal HSYNC, an input data enable signal DE, and a clock signal CLK, together with the image data.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

To control the data driving circuit 130, the controller 140 may output various data control signals DCS including, e.g., a source start pulse SSP, a source sampling clock SSC, and a source output enable signal SOE, to the data driving circuit 130.

The source start pulse SSP may control the data sampling start timing of one or more source driver integrated circuits SDICs constituting the data driving circuit 130. The source sampling clock SSC may be a clock signal for controlling the sampling timing of data in each of one or more source driver integrated circuits SDIC. The source output enable signal SOE may control the output timing of the data driving circuit 130.

The touch display device 100 may further include a power management integrated circuit that supplies various voltages or currents to, or controls various voltages or currents to, the display panel 110, the gate driving circuit 120, the data driving circuit 130, and the like.

Each subpixel SP may be an area defined by the intersection of the gate line GL and the data line DL, and may have a liquid crystal layer disposed thereon, or a light emitting element disposed thereon, depending on the type of touch display device 100.

For example, when the touch display device 100 is an organic light emitting display device, organic light emitting diodes (OLEDs) and various circuit elements may be disposed in the plurality of subpixels SP. Each subpixel SP may display a brightness corresponding to image data by controlling the current supplied to the OLED by several circuit elements.

Alternatively, in some cases, a light emitting diode (LED), a micro light emitting diode (μLED), or a quantum dot light emitting diode (QLED) may be disposed in the subpixel SP.

Referring to FIG. 2, each of the plurality of subpixels SP may include a light emitting element ED. The subpixel SP may include a driving transistor DRT that controls driving current supplied to the light emitting element ED.

The subpixel SP may include at least one circuit element in addition to the light emitting element ED and the driving transistor DRT to drive the subpixel SP.

For example, the subpixel SP may include a first transistor T1, a second transistor T2, a third transistor T3, a fourth transistor T4, a fifth transistor T5, and a storage capacitor Cstg.

The example shown in FIG. 2 illustrates a 6T1C structure in which 6 transistors and 1 capacitor are disposed, but embodiments of the disclosure are not limited thereto. Although the example shown in FIG. 2 illustrates a case where the transistors are P-type, at least some of the transistors disposed in the subpixel SP may be N-type.

Further, the transistor disposed in the subpixel SP may include a semiconductor layer formed of low temperature polysilicon (LTPS) or a semiconductor layer formed of an oxide semiconductor in one embodiment. Alternatively, in some cases, transistors including a semiconductor layer formed of low-temperature polycrystalline silicon and transistors including a semiconductor layer formed of an oxide semiconductor may be mixed and disposed in the subpixel SP.

The first transistor T1 may be electrically connected between the data line DL and the first node N1. The first transistor T1 may be controlled by the first scan signal Scan1 supplied through the first gate line GL1. The first transistor T1 may control application of the data voltage Vdata to the first node N1.

The second transistor T2 may be electrically connected between the second node N2 and the third node N3. The second node N2 may be the gate node of the driving transistor DRT. The third node N3 may be the drain node or source node of the driving transistor DRT. The second transistor T2 may be controlled by the second scan signal Scan2 supplied through the second gate line GL2. The second transistor T2 may perform an operation for compensating for a change in the threshold voltage of the driving transistor DRT.

The third transistor T3 may be electrically connected between the line to which the reference voltage Vref is supplied and the first node N1. The third transistor T3 may be controlled by the emission control signal EM supplied through the emission control line EML. The third transistor T3 may control discharge of the first node N1 or application of the reference voltage Vref to the first node N1.

The fourth transistor T4 may be electrically connected between the third node N3 and the fifth node N5. The fifth node N5 may be a node electrically connected to the light emitting element ED. The fourth transistor T4 may be controlled by the emission control signal EM supplied through the emission control line EML. The fourth transistor T4 may control the timing when the driving current is supplied to the light emitting element ED.

The fifth transistor T5 may be electrically connected between the line to which the reference voltage Vref is supplied and the fifth node N5. The fifth transistor T5 may be controlled by the second scan signal Scan2 supplied through the second gate line GL2. The fifth transistor T5 may control discharge of the fifth node N5 or application of the reference voltage Vref to the fifth node N5.

The driving transistor DRT may be electrically connected between the fourth node N4 and the third node N3. The fourth node N4 may be electrically connected to a line to which the first driving voltage VDD is supplied. The first driving voltage VDD may be a high-potential driving voltage in one embodiment. The fourth node N4 may be the source node or drain node of the driving transistor DRT.

The driving transistor DRT may be controlled by a voltage difference between the voltage of the second node N2 and the voltage of the fourth node N4. The driving transistor DRT may control the driving current supplied to the light emitting element ED.

The driving transistor DRT may include a back gate electrode electrically connected to the fourth node N4. The current output of the driving transistor DRT may be stably achieved by the back gate electrode electrically connected to the source node of the driving transistor DRT. For example, the back gate electrode may be disposed using a metal layer to block external light from entering the channel of the driving transistor DRT.

The light emitting element ED may be electrically connected between the fifth node N5 and the line to which the second driving voltage VSS is supplied. The second driving voltage VSS may be a low-potential driving voltage that is less than the high-potential driving voltage VDD in one embodiment.

The light emitting element ED may include a first electrode layer E1 electrically connected to the fifth node N5, a second electrode layer E2 to which the second driving voltage VSS is applied, and a light emitting layer EL disposed between the first electrode layer E1 and the second electrode layer E2.

The light emitting element ED may display a brightness according to the driving current supplied by the driving transistor DRT. The driving timing of the light emitting element ED may be controlled by the fourth transistor T4.

The driving timing of the subpixel SP shown in FIG. 2 is briefly described. A turn-on level second scan signal Scan2 may be supplied through the second gate line GL2. Since the transistor disposed in the subpixel SP is a P type, the turn-on level may be a low level.

The second transistor T2 and the fifth transistor T5 may be turned on by the turn-on level second scan signal Scan2.

Since the second transistor T2 is turned on, the second node N2 and the third node N3 may be electrically connected. A voltage obtained by reflecting the threshold voltage of the driving transistor DRT to the first driving voltage VDD may be applied to the second node N2 through the second transistor T2. Through this process, a change in the threshold voltage of the driving transistor DRT may be compensated for.

Since the fifth transistor T5 is turned on, the reference voltage Vref may be applied to the fifth node N5. The fifth node N5 may be initialized.

Thereafter, the turn-on level first scan signal Scan1 may be supplied through the first gate line GL1.

The first transistor T1 may be turned on by the turn-on level first scan signal Scan1.

Since the first transistor T1 is turned on, the data voltage Vdata may be applied to the first node N1.

The first driving voltage VDD, which reflects the data voltage Vdata and the threshold voltage of the driving transistor DRT may be applied to two opposite ends of the storage capacitor Cstg.

Thereafter, the turn-on level emission control signal EM may be supplied through the emission control line EML.

The third transistor T3 and the fourth transistor T4 may be turned on.

Since the third transistor T3 is turned on, the voltage of the first node N1 may be changed to the reference voltage Vref. The voltage of the second node N2 coupled to the first node N1 may be changed according to a change in voltage of the first node N1.

The voltage obtained by reflecting the threshold voltage of the driving transistor DRT and the data voltage Vdata to the first driving voltage VDD may be applied to the second node N2, and the first driving voltage VDD may be applied to the fourth node N4. The difference between the voltage of the second node N2 and the voltage of the fourth node N4 may be the voltage which reflects the data voltage Vdata and the threshold voltage of the driving transistor DRT. A driving current corresponding to the data voltage Vdata may be supplied by the driving transistor DRT.

Since the fourth transistor T4 is turned on, the driving current supplied by the driving transistor DRT may be supplied to the light emitting element ED.

The light emitting element ED may represent a brightness according to the driving current, and the subpixel SP including the light emitting element ED may display an image corresponding to image data.

Further, embodiments of the present disclosure may implement a touch sensor structure on the display panel 110 that displays images, providing the function for sensing the user's touch on the display panel 110.

Figure 3:
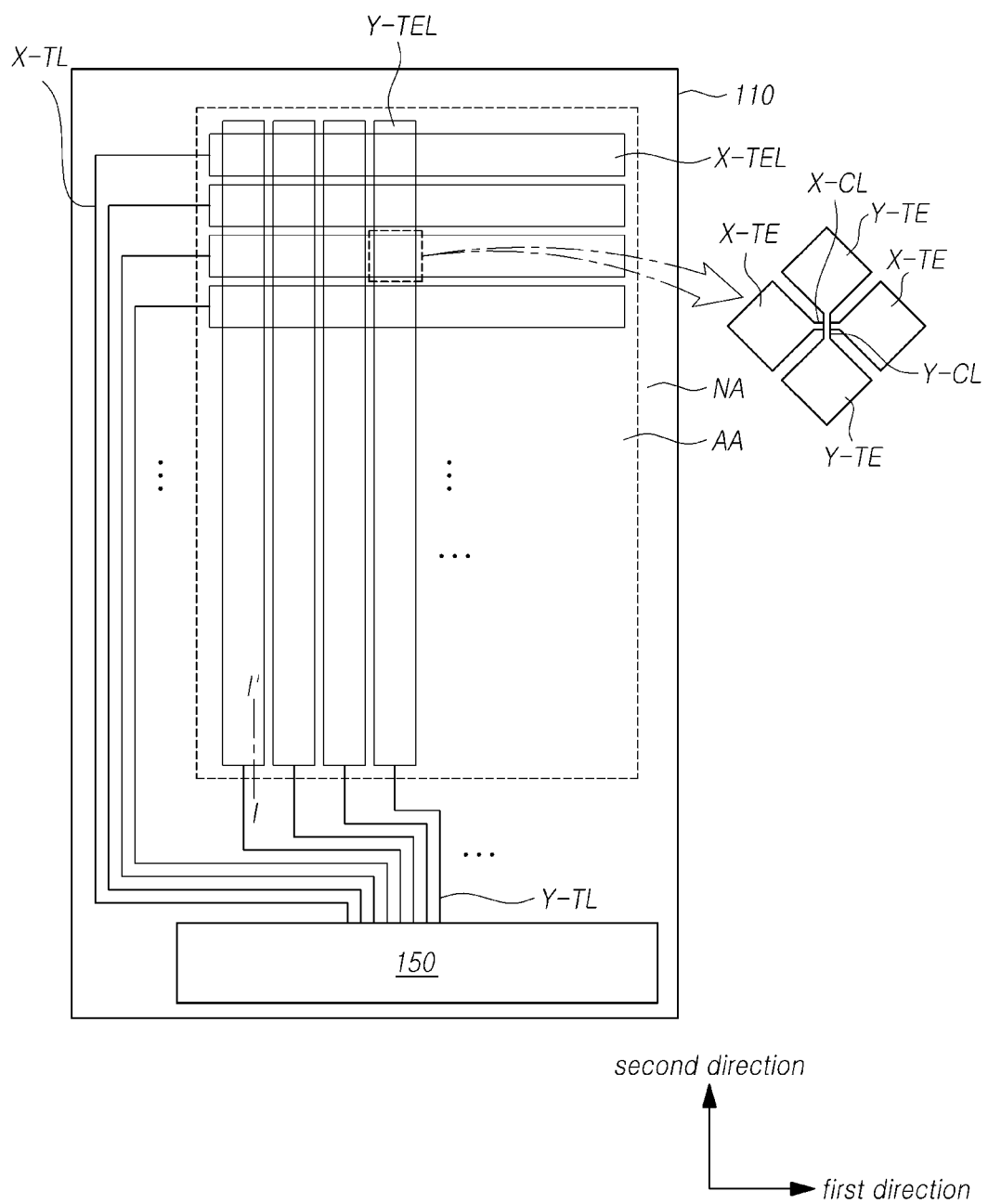
FIG. 3 is a view illustrating an example of a touch sensor structure included in a touch display device according to embodiments of the disclosure.
Figure 4:
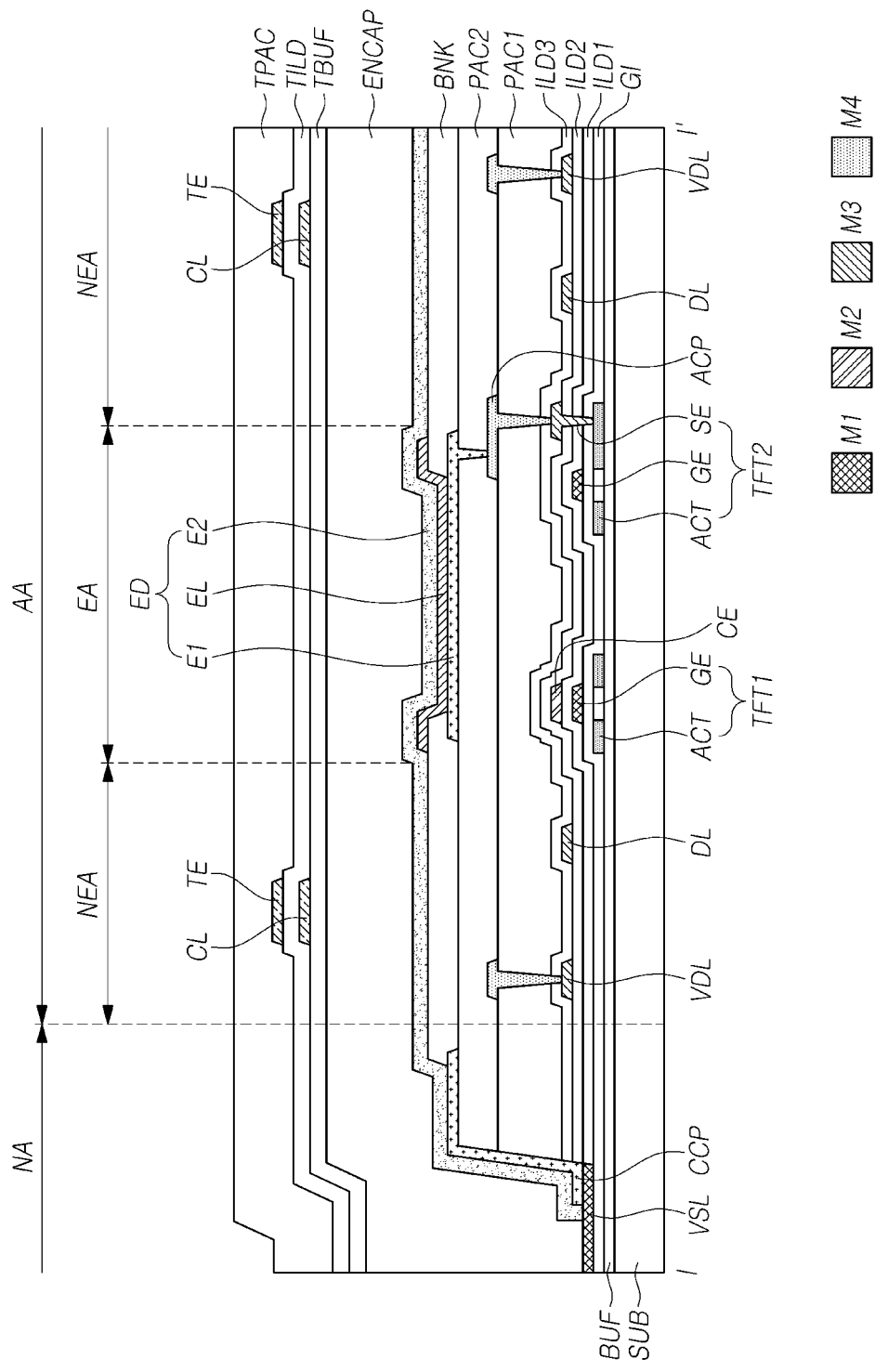
FIG. 4 is a cross-sectional view illustrating an example structure, taken along line I-I' of FIG. 3 according to embodiments of the disclosure.

FIG. 3 is a view illustrating an example of a touch sensor structure included in a touch display device 100 according to embodiments of the disclosure. FIG. 4 is a cross-sectional view illustrating an example structure, taken along line I-I' of FIG. 3 according to embodiments of the disclosure.

Referring to FIG. 3, the touch display device 100 may include a plurality of touch electrode lines TEL and a plurality of touch routing lines TL disposed on the display panel 110. The touch display device 100 may include a touch driving circuit 150 that drives the plurality of touch electrode lines TEL and the plurality of touch routing lines TL.

Each of the plurality of touch electrode lines TEL may be electrically connected to the touch driving circuit 150 through a touch routing line TL. The touch driving circuit 150 may be disposed separately or, in some cases, it may be integrated with a circuit for display driving. For example, the touch driving circuit 150 may be integrated with the data driving circuit 130.

Each of the plurality of touch electrode lines TEL may include a plurality of touch electrodes TE electrically connected to each other along one direction. Further, each of the plurality of touch electrode lines TEL may include a plurality of touch electrode connection patterns CL electrically connecting the plurality of touch electrodes TE to each other.

For example, each of the plurality of X-touch electrode lines X-TEL may include a plurality of X-touch electrodes X-TE arranged along a first direction and a plurality of X-touch electrode connection patterns X-CL electrically connecting the plurality of X-touch electrodes X-TE.

For example, each of the plurality of Y-touch electrode lines Y-TEL may include a plurality of Y-touch electrodes Y-TE arranged along a second direction crossing the first direction and a plurality of Y-touch electrode connection patterns Y-CL electrically connecting the plurality of Y-touch electrodes Y-TE.

The X-touch electrode line X-TEL and the Y-touch electrode line Y-TEL may be disposed on different layers.

Alternatively, the X-touch electrodes X-TE and Y-touch electrodes Y-TE may be disposed on the same layer. In this case, either the X-touch electrode connection pattern X-CL or the Y-touch electrode connection pattern Y-CL may be disposed on a different layer from the touch electrode TE.

For example, the touch electrode TE may have a rectangular shape, but is not limited thereto.

The touch electrode TE may be formed of a transparent conductive material and may be positioned without interfering with the image display capabilities of the display panel 110.

Alternatively, the touch electrode TE may be formed of an opaque metal. In this case, the touch electrode TE may have an open area corresponding to the emission area of the light emitting element ED disposed on the display panel 110. For example, the touch electrode TE may be implemented in a mesh shape and disposed to avoid the emission area.

Referring to FIG. 4, the substrate SUB may include an active area AA in which a plurality of subpixels SP are disposed and a non-active area NA positioned outside the active area AA.

The active area AA may include an emission area EA in which light is emitted by the light emitting element ED and a non-emission area NEA that is an area other than the emission area EA.

A buffer layer BUF may be disposed on the substrate SUB.

A thin film transistor TFT may be disposed on the buffer layer BUF.

The thin film transistor TFT may include an active layer ACT and a gate electrode GE. The thin film transistor TFT may include a source electrode SE and a drain electrode (not shown).

The active layer ACT may be positioned on the buffer layer BUF. The active layer ACT may be formed of a semiconductor material. The active layer ACT may be formed of amorphous silicon or polycrystalline silicon. Alternatively, the active layer ACT may be formed of an oxide semiconductor.

A gate insulation layer GI may be disposed on the active layer ACT.

The gate electrode GE may be positioned on the gate insulation layer GI. The gate electrode GE may be disposed using the first metal layer M1.

Several signal lines may be disposed using the first metal layer M1.

For example, the second power line VSL supplying the second driving voltage VSS may be disposed using the first metal layer M1.

The second power line VSL may be positioned in the non-active area NA. In some embodiments, the second power line VSL may be positioned in the active area AA.

The second power line VSL may be electrically connected to the second electrode layer E2. A second electrode connection pattern CCP may be positioned in at least a partial area between the second power line VSL and the second electrode layer E2.

A first inter-layer insulation layer ILD1 may be disposed on the gate electrode GE.

A capacitor electrode CE may be positioned on the first inter-layer insulation layer ILD1. The capacitor electrode CE may be disposed using the second metal layer M2.

The capacitor electrode CE, together with the gate electrode GE of the first thin film transistor TFT1, may form a storage capacitor Cstg. The first thin film transistor TFT1 may be the driving transistor DRT shown in FIG. 2 according to one embodiment.

A second inter-layer insulation layer ILD2 may be disposed on the capacitor electrode CE.

A source electrode SE may be positioned on the second inter-layer insulation layer ILD2. The source electrode SE may be electrically connected to the active layer ACT through a contact hole. The source electrode SE may be disposed using the third metal layer M3.

Several signal lines may be disposed using the third metal layer M3.

For example, the data line DL for supplying the data voltage Vdata may be disposed using the third metal layer M3. The first power line VDL for supplying the first driving voltage VDD may be disposed using the third metal layer M3.

A portion of the first power line VDL may be positioned in the active area AA. In some cases, the first power line VDL may be positioned in the non-active area NA.

The data line DL, the first power line VDL, and the second power line VSL may be disposed in various ways by using at least a portion of several metal layers.

FIG. 4 illustrates an example in which the data line DL and the first power line VDL are disposed using the third metal layer M3, but the data line DL and the first power line VDL may be disposed using the first metal layer M1 or the second metal layer M2.

Further, as in the example shown in FIG. 4, the first power line VDL may include a portion formed of the third metal layer M3 and a portion formed of the fourth metal layer M4. Accordingly, the resistance of the first power line VDL may be reduced.

A third inter-layer insulation layer ILD3 may be disposed on the third metal layer M3.

A first planarization layer PAC1 may be disposed on the third inter-layer insulation layer ILD3. The first planarization layer PAC1 may be formed of, e.g., an organic material.

A fourth metal layer M4 may be positioned on the first planarization layer PAC1.

A portion of the first power line VDL may be disposed using the fourth metal layer M4.

A first electrode connection pattern ACP may be disposed using the fourth metal layer M4. The second thin film transistor TFT2 and the light emitting element ED may be electrically connected by the first electrode connection pattern ACP. The second thin film transistor TFT2 may be the fourth transistor T4 or the fifth transistor T5 shown in FIG. 2 in one embodiment.

A second planarization layer PAC2 may be disposed on the fourth metal layer M4. The second planarization layer PAC2 may be formed of an organic material in one embodiment.

A light emitting element ED may be disposed on the second planarization layer PAC2.

The first electrode layer E1 of the light emitting element ED may be positioned on the second planarization layer PAC2.

A bank layer BNK may be disposed on the second planarization layer PAC2 while exposing a portion of the first electrode layer E1.

A light emitting layer EL may be positioned on the first electrode layer E1. The light emitting layer EL may be positioned on a portion of the bank layer BNK.

A second electrode layer E2 may be positioned on the light emitting layer EL and the bank layer BNK.

An emission area EA may be determined by the bank layer BNK.

An encapsulation layer ENCAP may be disposed on the light emitting element ED. The encapsulation layer ENCAP may be formed of a single layer or multiple layers. For example, the encapsulation layer ENCAP may include a first inorganic layer, an organic layer, and a second inorganic layer.

A touch sensor structure may be disposed on the encapsulation layer ENCAP.

For example, the touch buffer layer TBUF may be positioned on the encapsulation layer ENCAP. The touch buffer layer TBUF may be formed of, e.g., an inorganic material. In some cases, the touch buffer layer TBUF may not be disposed. In this case, the electrode included in the touch sensor structure may be directly disposed on the encapsulation layer ENCAP.

A touch electrode connection pattern CL may be positioned on the touch buffer layer TBUF.

A touch insulation layer TILD may be positioned on the touch electrode connection pattern CL. The touch insulation layer TILD may be an organic material or an inorganic material. When the touch insulation layer TILD is an organic material, a layer formed of an inorganic material may be further disposed between the touch insulation layer TILD and the touch electrode connection pattern CL.

The touch electrode TE may be positioned on the touch insulation layer TILD.

A touch protection layer TPAC may be disposed on the touch electrode TE.

Since the touch electrode TE and the touch electrode connection pattern CL are disposed using a plurality of layers, it is possible to easily implement the touch sensor structure that include the X-touch electrode line X-TEL and the Y-touch electrode line Y-TEL.

The touch electrode TE and the touch electrode connection pattern CL may be disposed while avoiding the emission area EA. The touch electrode TE and the touch electrode connection pattern CL may overlap the non-emission area NEA, but are non-overlapping with the emission area EA.

Since the touch electrode TE and the touch electrode connection pattern CL are disposed on the encapsulation layer ENCAP while avoiding the emission area EA, the touch sensor structure may be included in the display panel 110 without affecting the image display function of the display panel 110.

Although not shown in FIG. 4, a touch routing line TL connected to the touch electrode TE may be disposed along an inclined surface of the encapsulation layer ENCAP. The touch routing line TL may be positioned on the same layer as the touch electrode TE and may be positioned on the same layer as the touch electrode connection pattern CL. Alternatively, the touch routing line TL may be disposed using the two layers. The touch routing line TL may be electrically connected to the pad positioned in the non-active area NA.

In a structure in which a plurality of X-touch electrode lines X-TEL and a plurality of Y-touch electrode lines Y-TEL are disposed to cross each other, the touch driving circuit 150 may perform touch sensing while driving the touch electrode line TEL through the touch routing line TL.

For example, one of the X-touch electrode line X-TEL and the Y-touch electrode line Y-TEL may be a touch driving electrode line to which a touch driving signal is applied. The other one of the X-touch electrode line X-TEL and the Y-touch electrode line Y-TEL may be a touch sensing electrode line from which a touch sensing signal is detected.

The touch driving circuit 150 may detect a change in mutual capacitance that occurs when the user touches in a state in which different signals are applied to the X-touch electrode line X-TEL and the Y-touch electrode line Y-TEL.

The touch driving circuit 150 may transfer sensing data according to the detected change in mutual capacitance to the touch controller. The touch controller may detect whether a touch to the display panel 110 has occurred and touch coordinates based on the sensing data received from the touch driving circuit 150.

The touch electrode lines TEL disposed on the display panel 110 may be divided and disposed in multiple areas in the active area AA.

Since the touch electrode line TEL is divided and disposed for each area, the load of the touch electrode line TEL may be reduced. When the area of the display panel 110 increases, it is possible to reduce the load of the touch electrode line TEL while enhancing touch sensing performance.

Further, the manner in which the touch electrode line TEL is driven or sensed may differ depending on where the touch electrode line TEL is disposed on the display panel 110. That is, a first touch electrode line TEL located in a first location may be driven or sensed in a first manner whereas a second touch electrode line TEL located in a second location that is different from the first location is driven or sensed in a second manner that is different from the first manner Since the touch electrode lines TEL are driven differently depending on the position of each touch electrode line TEL, it is possible to reduce deviation or distortion of touch sensing through the touch electrode line TEL when a difference in touch electrode line TEL exists depending on the area.

Figure 5:
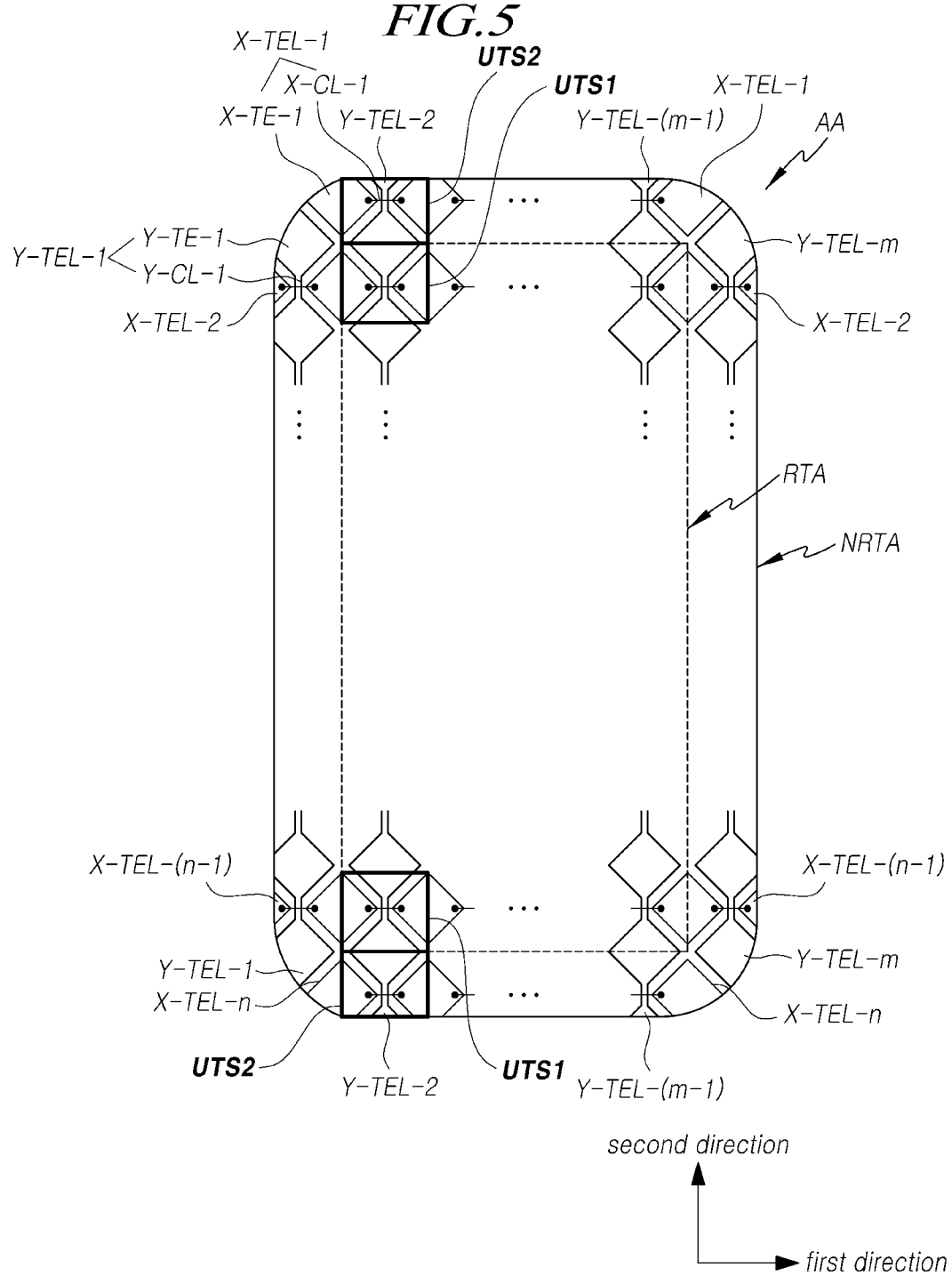
FIG. 5 is a view illustrating an example of a structure in which a touch electrode is disposed in a touch display device according to embodiments of the disclosure.
Figure 6:
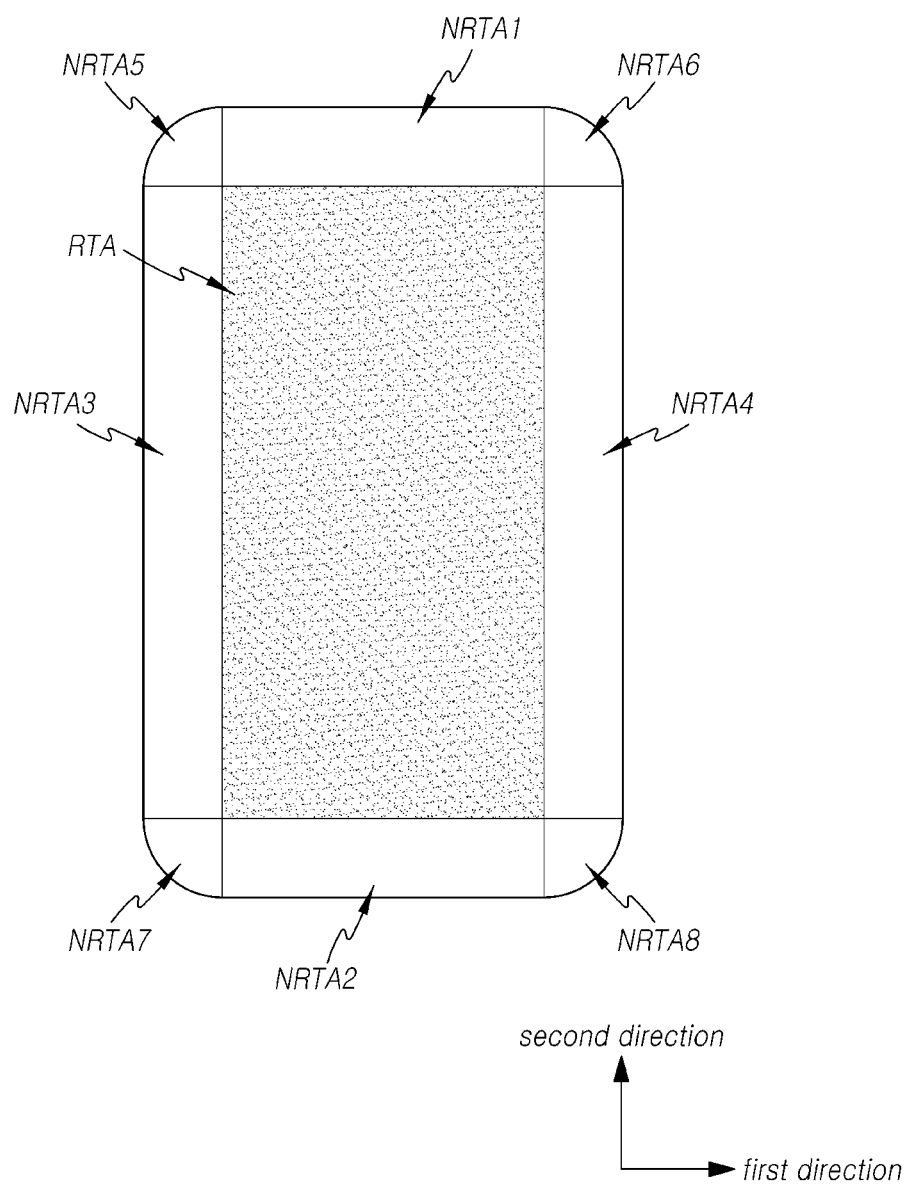
FIG. 6 is an example in which areas are divided according to a structure in which a touch electrode is disposed in a touch display device according to embodiments of the disclosure.

FIG. 5 is a view illustrating an example of a structure in which a touch electrode TE is disposed in a touch display device 100 according to embodiments of the disclosure. FIG. 6 is an example in which areas are divided according to a structure in which a touch electrode TE is disposed in a touch display device 100 according to embodiments of the disclosure.

Referring to FIGS. 5 and 6, a plurality of X-touch electrode lines X-TEL and a plurality of Y-touch electrode lines Y-TEL may be disposed in the active area AA of the display panel 110. For example, n (n is a natural number) X-touch electrode lines X-TEL and m (m is a natural number) Y-touch electrode lines Y-TEL may be disposed in the active area AA. In one embodiment, the plurality of X-touch electrode lines X-TEL include first touch driving electrode lines disposed in both a reference touch area RTA (e.g., a first area) and a non-reference touch area NRTA (e.g., a second area) and second touch driving electrode lines disposed in the non-reference touch area NRTA but not the reference touch area RTA. Similarly, in one embodiment, the plurality of Y-touch electrode lines Y-TEL include first touch sensing electrode lines disposed in both a reference touch area RTA and a non-reference touch area NRTA and second touch sensing electrode lines disposed in the non-reference touch area NRTA but not the reference touch area RTA.

Each of the n X-touch electrode lines X-TEL may include two or more X-touch electrodes X-TE and at least one X-touch electrode connection pattern X-CL electrically connecting the two or more X-touch electrodes X-TE. For example, the first X-touch electrode line X-TEL-1 may include two or more first X-touch electrodes X-TE-1 and at least one first X-touch electrode connection pattern X-CL-1 that connect together the two or more first X-touch electrodes X-TE-1.

m Y-touch electrode lines Y-TEL may include two or more Y-touch electrodes Y-TE and at least one Y-touch electrode connection pattern Y-CL electrically connecting the two or more Y-touch electrodes Y-TE. For example, the first Y-touch electrode line Y-TEL-1 may include two or more first Y-touch electrodes Y-TE-1 and at least one first Y-touch electrode connection pattern Y-CL-1 that connect together the two or more first Y-touch electrodes Y-TE-1.

Either the X-touch electrode line X-TEL and the Y-touch electrode line Y-TEL may be a touch driving electrode line. The other one of the X-touch electrode line X-TEL and the Y-touch electrode line Y-TEL may be a touch sensing electrode line.

An example case where the X-touch electrode line X-TEL is a touch driving electrode line and the Y-touch electrode line Y-TEL is a touch sensing electrode line is described. In some cases, the X-touch electrode line X-TEL may be a touch sensing electrode line, and the Y-touch electrode line Y-TEL may be a touch driving electrode line.

A unit touch sensor UTS may be defined by the intersection of a portion of the X-touch electrode line X-TEL and a portion of the Y-touch electrode line Y-TEL. The unit touch sensor UTS may include a node where one touch coordinate position is detected in one embodiment. A unit touch sensor UTS may be formed by the X-touch electrode X-TE and the Y-touch electrode Y-TE in the area where a portion of the X-touch electrode line X-TEL and a portion of the Y-touch electrode line Y-TEL intersect.

Since the unit touch sensor UTS is a node where one touch coordinate position is detected, the unit touch sensor UTS may have a constant size in the active area AA.

Alternatively, in some cases, the size of the unit touch sensor UTS may be different depending on the position of the active area AA. When the size of the unit touch sensor UTS differs, deviation or distortion of a detected signal may occur due to a difference in the area of the touch electrode TE.

The touch display device 100 according to embodiments of the disclosure may divide the active area AA into multiple areas according to the unit touch sensor UTS and independently apply a driving or sensing scheme to each of the multiple areas, reducing or preventing degradation of sensing accuracy due to a difference in size of the unit touch sensor UTS.

For example, the active area AA may include the reference touch area RTA (e.g., a first area) and the non-reference touch area NRTA (e.g., a second area).

A plurality of first unit touch sensors UTS1 may be positioned in the reference touch area RTA. A plurality of second unit touch sensors UTS2 may be positioned in the non-reference touch area NRTA.

At least one of the shape or size of the first unit touch sensor UTS1 may be different from the shape or size of the second unit touch sensor UTS2. For example, the size of the first unit touch sensor UTS1 may be larger than that of the second unit touch sensor UTS2.

The size of the plurality of first unit touch sensors UTS1 positioned in the reference touch area RTA may be constant. That is, each of the first unit touch sensors UTS1 have a same size. The plurality of second unit touch sensors UTS2 positioned in the non-reference touch area NRTA may include two or more second unit touch sensors UTS2 having different shapes or sizes from each other.

The examples shown in FIGS. 5 and 6 represent cases in which the reference touch area RTA is positioned in the center of the active area AA and the non-reference touch area NRTA is positioned at the perimeter of the active area AA (e.g., around the active area AA). Thus, the non-reference touch area NRTA is around the reference touch area RTA in a plan view of the display device 100. In some cases, a portion of the reference touch area RTA may be positioned at the perimeter of the active area AA.

The reference touch area RTA and the non-reference touch area NRTA may be distinguished according to the uniformity or size of the unit touch sensor UTS positioned in each area.

Further, the examples shown in FIGS. 5 and 6 represent cases in which all touch electrode lines TEL are connected along the first direction or the second direction. However, in some cases, even in a structure in which the touch electrode lines TEL are divided and disposed in a plurality of areas in the active area AA, embodiments of the disclosure may apply where the shape or size of the unit touch sensor UTS differs depending on the position.

The touch electrode line TEL positioned in the reference touch area RTA and the touch electrode line TEL positioned in the non-reference touch area NRTA may be driven differently. A driving scheme of the touch driving electrode line positioned in the reference touch area RTA may be different from a driving scheme of the touch driving electrode line positioned in the non-reference touch area NRTA. Further, a sensing scheme of a touch sensing electrode line positioned in the reference touch area RTA may be different from a sensing scheme of a touch sensing electrode line positioned in the non-reference touch area NRTA.

In an example, the driving scheme of the touch driving electrode line including the portion positioned in the reference touch area RTA may be different from the driving scheme of the touch driving electrode line positioned in the first non-reference touch area NRTA1, the fifth non-reference touch area NRTA5, and the sixth non-reference touch area NRTA6 positioned on an upper side of the reference touch area RTA. In other words, the scheme for driving the second X-touch electrode line X-TEL-2 to the (n−1)th X-touch electrode line X-TEL-(n−1) may be different from the scheme for driving the first X-touch electrode line X-TEL-1.

In an example, the driving scheme of the touch driving electrode line including the portion positioned in the reference touch area RTA may be different from the driving scheme of the touch driving electrode line positioned in the second non-reference touch area NRTA2, the seventh non-reference touch area NRTA7, and the eighth non-reference touch area NRTA8 positioned on a lower side of the reference touch area RTA. The scheme for driving the second X-touch electrode line X-TEL-2 to the (n−1)th X-touch electrode line X-TEL-(n−1) may be different from the scheme for driving the nth X-touch electrode line X-TEL-n.

As another example, the sensing scheme of the touch sensing electrode line including the portion positioned in the reference touch area RTA may be different from the sensing scheme of the touch sensing electrode line positioned in the third non-reference touch area NRTA3, the fifth non-reference touch area NRTA5, and the seventh non-reference touch area NRTA7 positioned on a left side of the reference touch area RTA. The scheme for performing sensing through the second Y-touch electrode line Y-TEL-2 to the (m−1)th Y-touch electrode line Y-TEL-(m−1) may differ from the scheme for performing sensing through the first Y-touch electrode line Y-TEL-1.

The sensing scheme of the touch sensing electrode line including the portion positioned in the reference touch area RTA may be different from the sensing scheme of the touch sensing electrode line positioned in the fourth non-reference touch area NRTA4, the sixth non-reference touch area NRTA6, and the eighth non-reference touch area NRTA8 positioned on a right side of the reference touch area RTA. The scheme for performing sensing through the second Y-touch electrode line Y-TEL-2 to the (m−1)th Y-touch electrode line Y-TEL-(m−1) may differ from the scheme for performing sensing through the mth Y-touch electrode line Y-TEL-m.

The fifth non-reference touch area NRTA5, the sixth non-reference touch area NRTA6, the seventh non-reference touch area NRTA7, and the eighth non-reference touch area NRTA8 may differ in touch driving electrode line driving scheme from the reference touch area RTA.

As such, in a structure in which the shape and size of the unit touch sensor UTS differ depending on the area where the touch electrode line TEL is positioned, since the driving scheme or sensing scheme of the touch electrode line TEL is different for each area, it is possible to enhance the accuracy of touch sensing while preventing or reducing signal distortion due to a difference in the unit touch sensor UTS.

Figure 7:
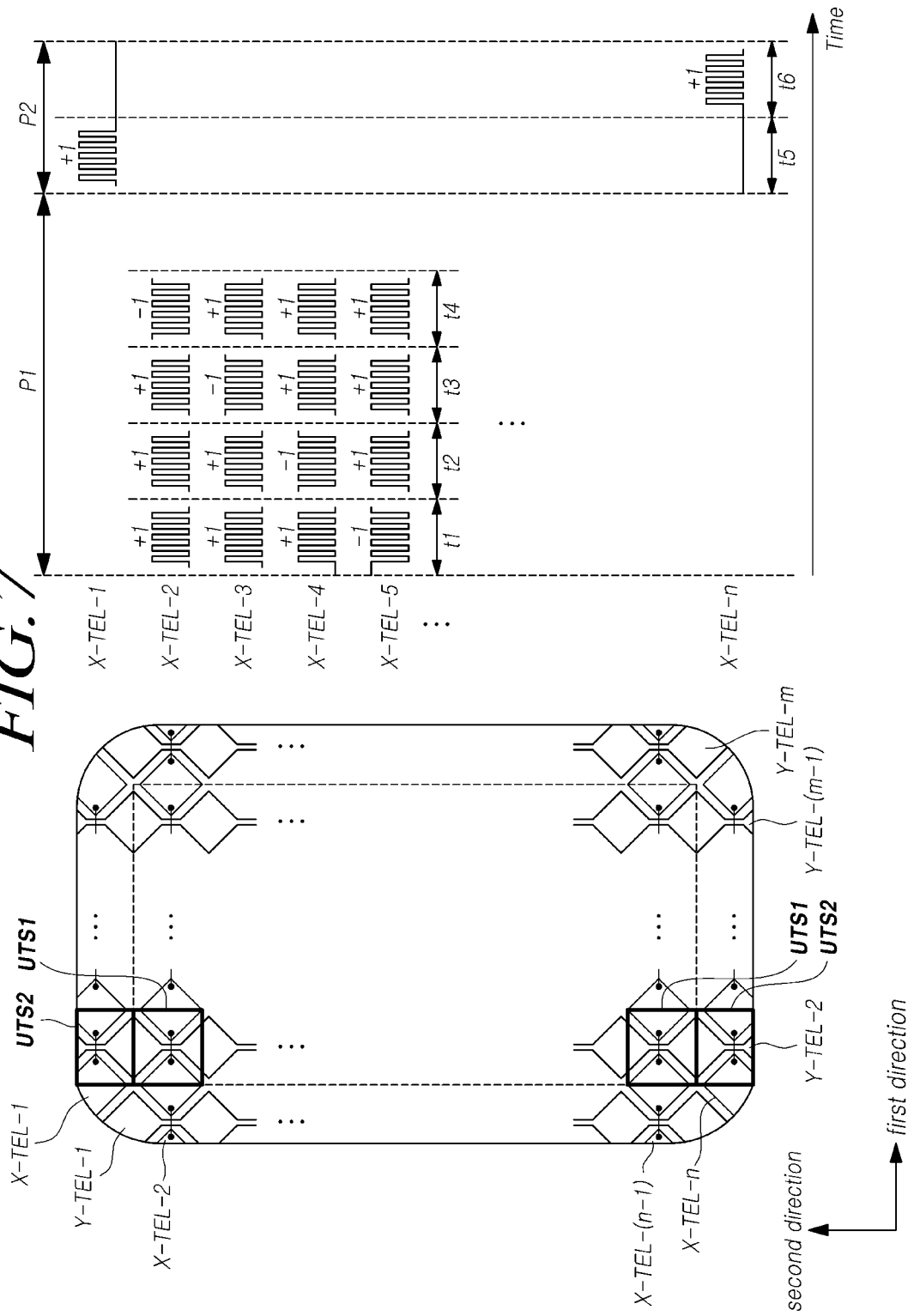
FIGS. 7 and 8 are views illustrating examples of a scheme in which a touch driving electrode line is driven for each of the divided areas shown in FIG. 6 according to embodiments of the disclosure.
Figure 8:
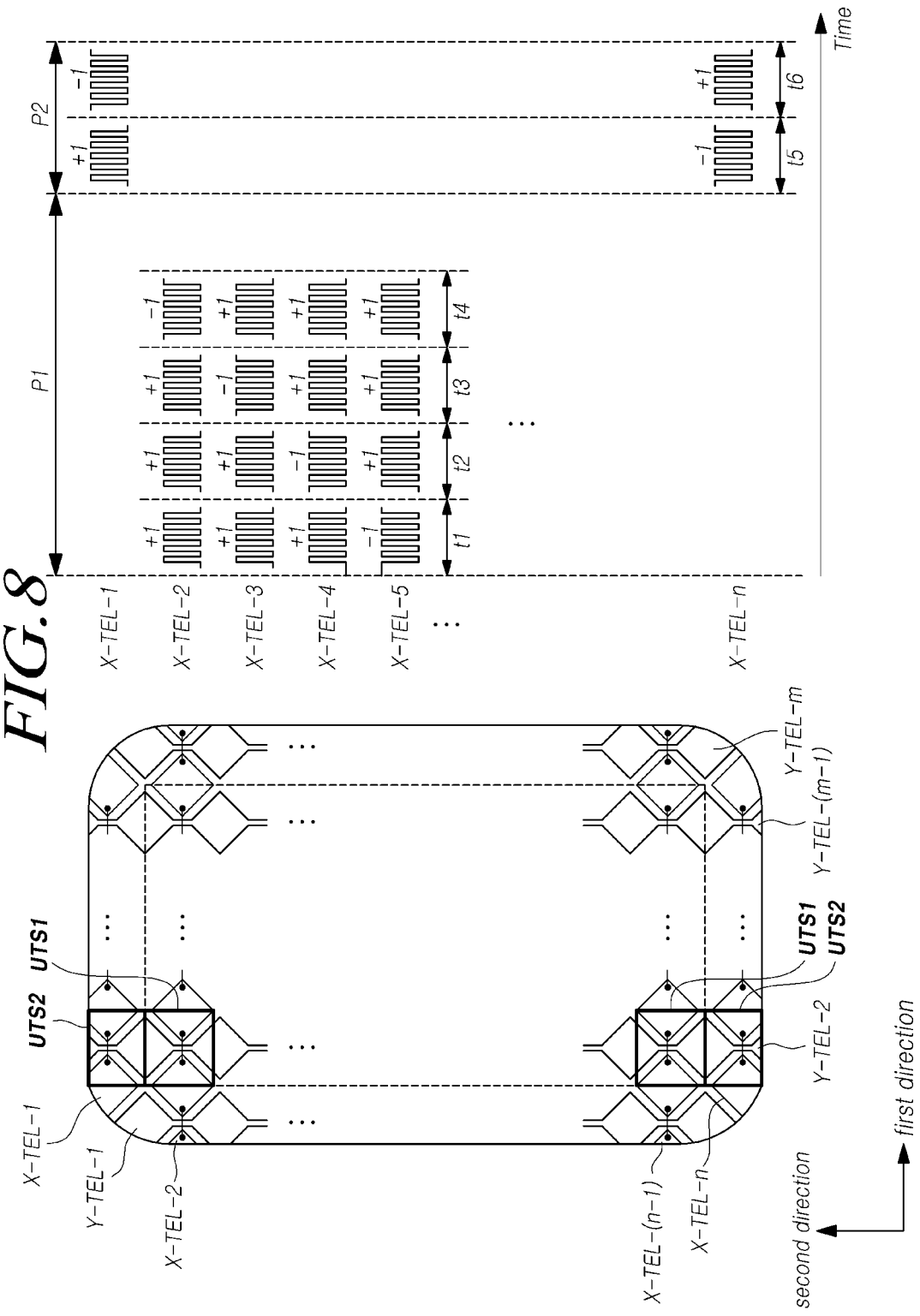

FIGS. 7 and 8 are views illustrating examples of a scheme in which a touch driving electrode line is driven for each of the divided areas shown in FIG. 6 according to one embodiment.

FIG. 7 illustrates an example in which a touch driving signal is supplied to a first X-touch electrode line X-TEL-1, a second X-touch electrode line X-TEL-2, . . . , an (n−1)th X-touch electrode line X-TEL-(n−1), and an nth X-touch electrode line X-TEL-n.

The period during which the touch driving signal is supplied to the second X-touch electrode line X-TEL-2 to the (n−1)th X-touch electrode line X-TEL-(n−1) including the portion positioned in the reference touch area RTA may differ from the period during which the touch driving signal is supplied to the first X-touch electrode line X-TEL-1 and the nth X-touch electrode line X-TEL-n positioned in the non-reference touch area NRTA.

For example, in a first period P1 (e.g., a first time period), the touch driving signal may be supplied to the X-touch electrode line X-TEL including the portion positioned in the reference touch area RTA.

The touch driving signal may be supplied to the X-touch electrode line X-TEL including the portion positioned in the non-reference touch area NRTA in a second period P2 (e.g., a second time period) different from the first period P1. As shown in FIG. 7, the second period P2 is after the first period P1. Thus, the first period P1 and the second period P2 are non-overlapping.

The first unit touch sensor UTS1 positioned in the reference touch area RTA and the second unit touch sensor UTS2 positioned in the non-reference touch area NRTA may include portions of the same touch sensing electrode line. When capacitance changes occurring in unit touch sensors UTS having different sizes are sensed through the same touch sensing electrode line, signal distortion may occur. It is possible to prevent or at least reduce distortion of the signal detected through the touch sensing electrode line by separating the driving periods of the first unit touch sensor UTS1 and the second unit touch sensor UTS2.

The touch driving signal may be simultaneously supplied to two or more X-touch electrode lines X-TEL among the plurality of X-touch electrode lines X-TEL including the portion positioned in the reference touch area RTA.

For example, touch driving signals may be simultaneously supplied to the second X-touch electrode line X-TEL-2, the third X-touch electrode line X-TEL-3, the fourth X-touch electrode line X-TEL-4, and the fifth X-touch electrode line X-TEL-5.

Since touch driving signals are simultaneously supplied to two or more X-touch electrode lines X-TEL, touch driving efficiency may be enhanced.

The phase of the touch driving signal supplied to at least one X-touch electrode line X-TEL among the two or more X-touch electrode lines X-TEL to which the touch driving signals are supplied may be different from the phase of the touch driving signals supplied to the remaining X-touch electrode lines X-TEL.

For example, the phase of the touch driving signals supplied to the second X-touch electrode line X-TEL-2, the third X-touch electrode line X-TEL-3, and the fourth X-touch electrode line X-TEL-4 at a first time t1 may differ from the phase of the touch driving signal supplied to the fifth X-touch electrode line X-TEL-5. The phase of the touch driving signal supplied to the fifth X-touch electrode line X-TEL-5 may be the reverse phase of the phase of the touch driving signals supplied to the remaining X-touch electrode line X-TEL.

Similarly, at each of a second time t2, a third time t3, and a fourth time t4, the reverse-phase touch driving signal may be supplied to the fourth X-touch electrode line X-TEL-4, the third X-touch electrode line X-TEL-3, and the second X-touch electrode line X-TEL-2.

It is possible to identify the coordinates where the touch is detected and enhance the efficiency of touch driving by varying the phases of the touch driving signals simultaneously supplied to two or more X-touch electrode lines X-TEL.

The first X-touch electrode line X-TEL-1 and the nth X-touch electrode line X-TEL-n positioned in the non-reference touch area NRTA may be driven at different periods than the X-touch electrode line X-TEL positioned in the reference touch area RTA.

The touch driving signals may be sequentially supplied to the first X-touch electrode line X-TEL-1 and the nth X-touch electrode line X-TEL-n positioned in the non-reference touch area NRTA. For example, the touch driving signal may be supplied to the first X-touch electrode line X-TEL-1 at the fifth time t5. The touch driving signal may be supplied to the nth X-touch electrode line X-TEL-n at the sixth time t6 that is after the fifth time t5.

Since the X-touch electrode line X-TEL positioned in the non-reference touch area NRTA is driven in a different period from the X-touch electrode line X-TEL positioned in the reference touch area RTA, touch sensing may be performed while preventing or reducing distortion of the signal detected to a touch occurring in the non-reference touch area NRTA.

FIG. 7 illustrates an example where one X-touch electrode line X-TEL is disposed on each of the upper and lower sides of the reference touch area RTA. However, in some cases, two or more X-Touch electrode lines X-TEL may be positioned on each of the upper and lower sides of the reference touch area RTA.

Further, touch driving signals may be simultaneously supplied to two or more X-touch electrode lines X-TEL positioned in the non-reference touch area NRTA.

Referring to FIG. 8, in a first period P1, the touch driving signal may be supplied to the X-touch electrode line X-TEL including the portion positioned in the reference touch area RTA. The touch driving signal may be supplied to the X-touch electrode line X-TEL positioned in the non-reference touch area NRTA in the second period P2.

In the first period P1, touch driving signals may be supplied to two or more X-touch electrode lines X-TEL including the portion positioned in the reference touch area RTA.

In the second period P2, touch driving signals may be supplied to two or more X-touch electrode lines X-TEL positioned in the non-reference touch area NRTA. The phase of the touch driving signal supplied to at least one of two or more X-touch electrode lines X-TEL positioned in the non-reference touch area NRTA may be different from the phase of the touch driving signals supplied to the remaining X-touch electrode line X-TEL.

For example, a normal-phase touch driving signal may be supplied to the first X-touch electrode line X-TEL-1 at the fifth time t5. A reverse-phase touch driving signal may be supplied to the nth X-touch electrode line X-TEL-n at the fifth time t5.

A reverse-phase touch driving signal may be supplied to the first X-touch electrode line X-TEL-1 at the sixth time t6. A normal-phase touch driving signal may be supplied to the nth X-touch electrode line X-TEL-n at the sixth time t6.

Since touch driving signals having different phases are simultaneously supplied to two or more X-touch electrode lines X-TEL positioned in the non-reference touch area NRTA, the driving efficiency of the touch driving electrode lines positioned in the non-reference touch area NRTA may be enhanced.

Further, since the touch driving electrode line of the non-reference touch area NRTA is driven in a period different from that of the touch driving electrode line including the portion positioned in the reference touch area RTA, it is possible to prevent or at least reduce signal distortion due to simultaneous driving of the non-reference touch area NRTA and the reference touch area RTA.

Further, a sensing scheme through touch sensing electrode lines positioned in the non-reference touch area NRTA may be distinguished or different from a sensing scheme through touch sensing electrode lines positioned in the reference touch area RTA.

Figure 9:
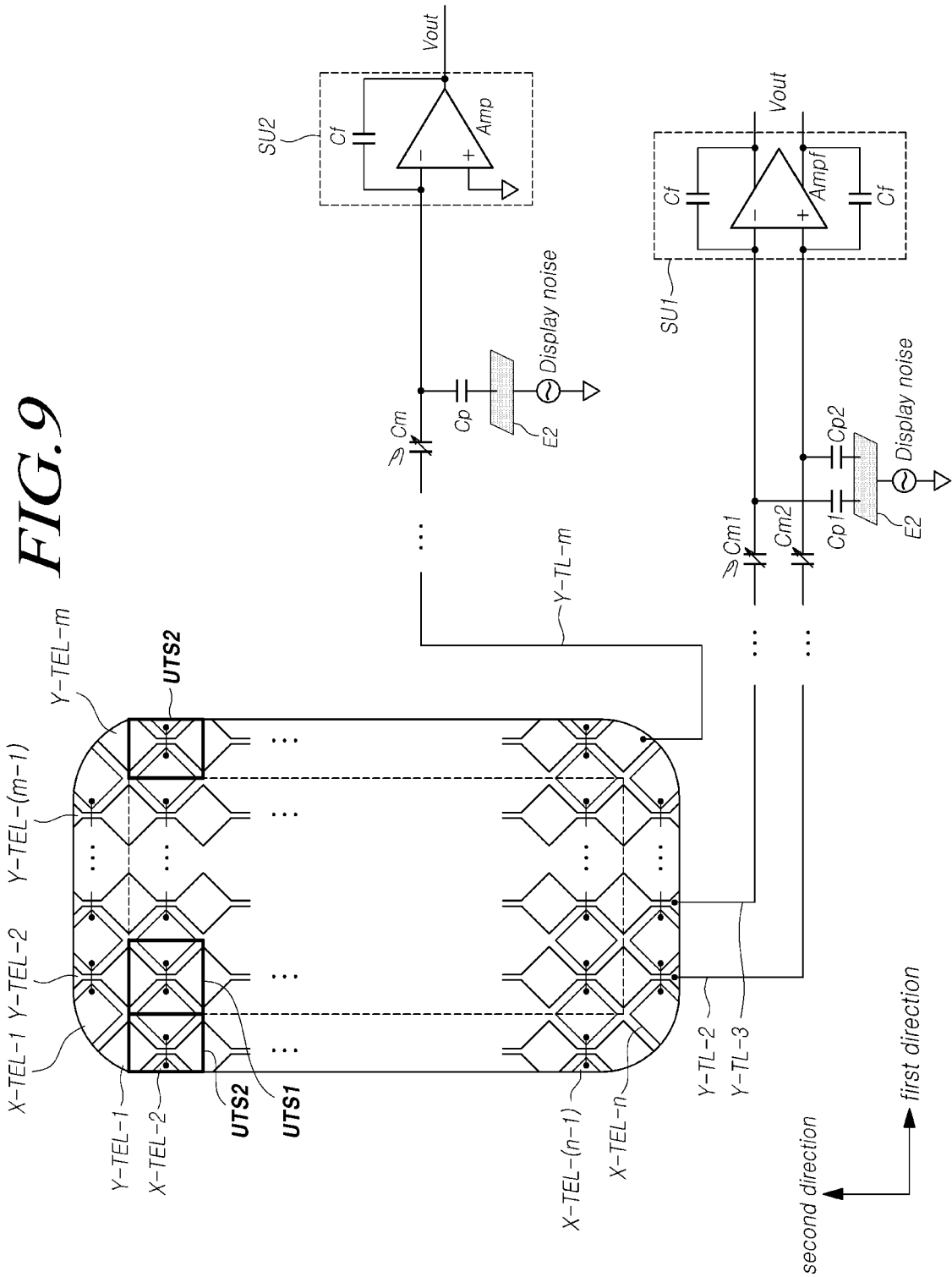
FIGS. 9 and 10 are views illustrating examples of a scheme in which sensing is performed through a touch sensing electrode line for each of the divided areas shown in FIG. 6 according to embodiments of the disclosure.
Figure 10:
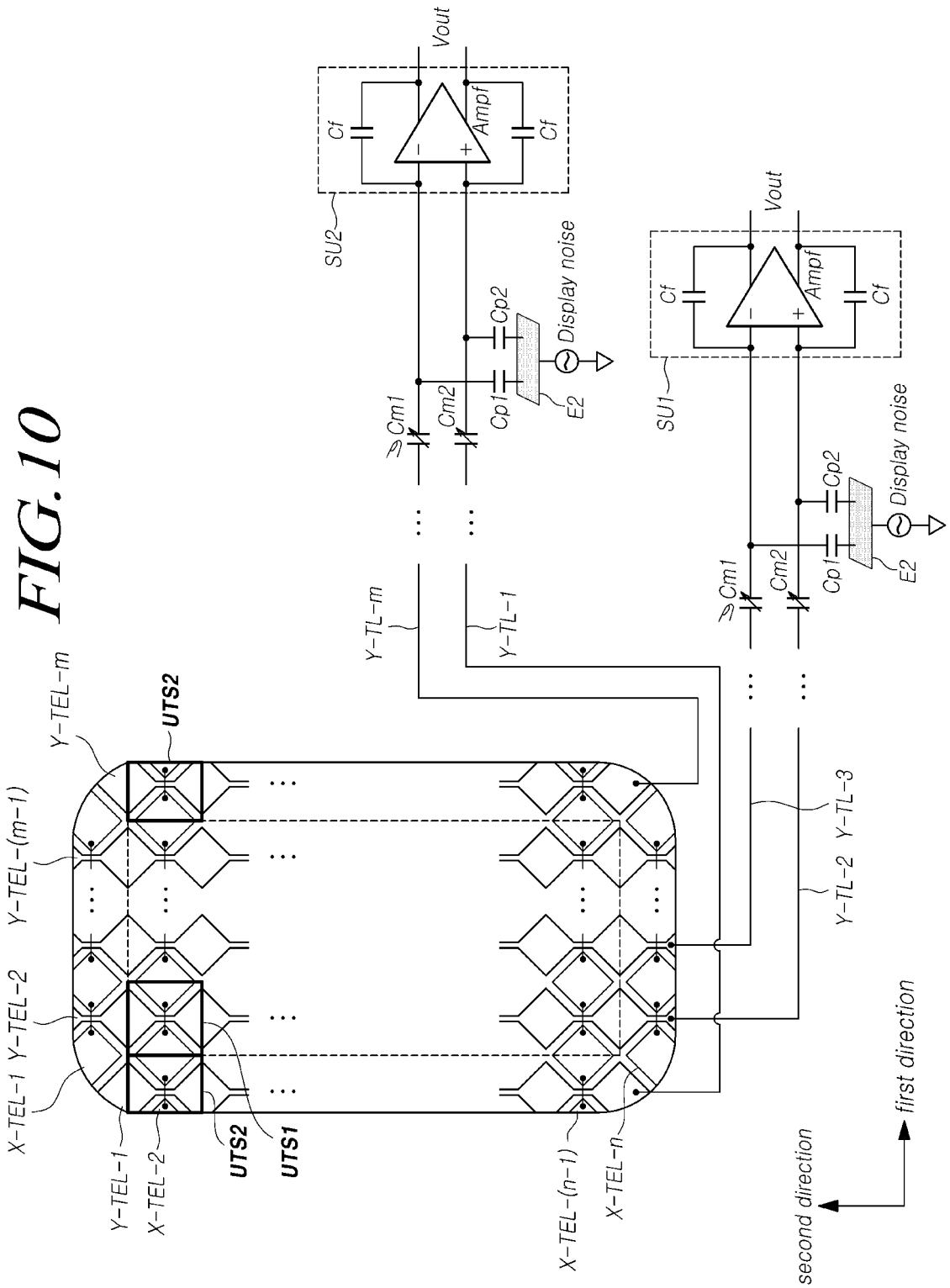

FIGS. 9 and 10 are views illustrating examples of a scheme in which sensing is performed through a touch sensing electrode line for each of divided areas shown in FIG. 6 according to one embodiment.

FIG. 9 illustrates an example of a scheme for detecting a touch sensing signal through a first Y-touch electrode line Y-TEL-1, a second Y-touch electrode line Y-TEL-2, . . . , an (m−1)th Y-touch electrode line Y-TEL-(m−1), and an mth Y-touch electrode line Y-TEL-m.

The Y-touch electrode line Y-TEL including a portion positioned in the reference touch area RTA may be driven by a differential sensing scheme in one embodiment. Touch sensing may be performed with adjacent Y-touch electrode lines connected to the same sensing unit SU (e.g., a circuit).

For example, the second Y-touch electrode line Y-TEL-2 may be electrically connected to the first sensing unit SU1 through the second Y-touch routing line Y-TL-2. The third Y-touch electrode line Y-TEL-3 adjacent to the second Y-touch electrode line Y-TEL-2 may be electrically connected with the first sensing unit SU1 through the third Y-touch routing line Y-TL-3.

The first sensing unit SU1 may be positioned in the touch driving circuit 150. The first sensing unit SU1 may be circuit including at least one feedback capacitor Cf and an amplifier Amp in one embodiment. The signal Vout output from the first sensing unit SU1 may be transferred to an integrator and an analog-to-digital converter. Alternatively, in some cases, an integrator or an analog-to-digital converter may be included in the first sensing unit SU1.

The first sensing unit SU1 may output a value corresponding to a difference between the first mutual capacitance Cm1 detected through the third Y-touch electrode line Y-TEL-3 and the second mutual capacitance Cm2 detected through the second Y-touch electrode line Y-TEL-2, for example.

Due to parasitic capacitance formed on the second Y-touch electrode line Y-TEL-2 or the third Y-touch electrode line Y-TEL-3, the signal detected through the second Y-touch electrode line Y-TEL-2 and the third Y-touch electrode line Y-TEL-3 may contain noise.

For example, the second Y-touch electrode line Y-TEL-2 and the third Y-touch electrode line Y-TEL-3, together with the second electrode layer E2 under the encapsulation layer ENCAP, may form parasitic capacitances Cp1 and Cp2. The second electrode layer E2 may be shaken due to fluctuations of the signal applied to the display signal line positioned under the second electrode layer E2. In this case, noise may be contained in the signal detected through the second Y-touch electrode line Y-TEL-2 or the third Y-touch electrode line Y-TEL-3 which, together with the second electrode layer E2, forms the parasitic capacitance Cp1 or Cp2.

The first sensing unit SU1 outputs a signal corresponding to a difference value between the signals detected from the second Y-touch electrode line Y-TEL-2 and the third Y-touch electrode line Y-TEL-3. Therefore, noise common to the second Y-touch electrode line Y-TEL-2 and the third Y-touch electrode line Y-TEL-3 may be removed. Accordingly, accuracy of touch sensing through the Y-touch electrode line Y-TEL including the portion positioned in the reference touch area RTA may be enhanced.

The Y-touch electrode line Y-TEL positioned in the non-reference touch area NRTA may be driven by a separate sensing unit SU from the sensing unit SU driving the Y-touch electrode line Y-TEL including the portion positioned in the reference touch area RTA.

For example, each of the first Y-touch electrode line Y-TEL-1 and the mth Y-touch electrode line Y-TEL-m positioned in the non-reference touch area NRTA may be electrically connected with a separate second sensing unit SU2. As in the example shown in FIG. 9, the mth Y-touch electrode line Y-TEL-m may be electrically connected to the second sensing unit SU2 through the mth Y-touch routing line Y-TL-m. The Y-touch electrode line Y-TEL positioned in the non-reference touch area NRTA may be driven by a single sensing scheme.

The second sensing unit SU2 (e.g., a circuit) may be electrically separated from the Y-touch electrode line Y-TEL including the portion positioned in the reference touch area RTA. The Y-touch electrode line Y-TEL including the portion positioned in the reference touch area RTA and the Y-touch electrode line Y-TEL positioned in the non-reference touch area NRTA may be independently driven.

The second sensing unit SU2 may output a signal Vout corresponding to the mutual capacitance Cm formed in the first Y-touch electrode line Y-TEL-1 or the mth Y-touch electrode line Y-TEL-m. Since the second sensing unit SU2 is driven by a single sensing scheme, the signal Vout output by the second sensing unit SU2 may be affected by a parasitic capacitance Cp formed in the Y-touch electrode line Y-TEL positioned in the non-reference touch area NRTA. The influence of the parasitic capacitance Cp may be removed or reduced in the process of processing the signal Vout output by the second sensing unit SU2 into a digital signal, for example.

Since touch sensing is performed through differential sensing between Y-touch electrode lines Y-TEL including the portion positioned in the reference touch area RTA, noise of the signal detected from the corresponding Y-touch electrode line Y-TEL may be removed.

Furthermore, the Y-touch electrode line Y-TEL positioned in the non-reference touch area NRTA) is driven separately from the Y-touch electrode line Y-TEL including the portion positioned in the reference touch area RTA, thus preventing or reducing distortion of the signal due to differential sensing of the Y-touch electrode lines Y-TEL with different sizes in unit touch sensor UTS.

Further, in some cases, touch sensing may be performed by differential sensing between Y-touch electrode lines Y-TEL positioned in the non-reference touch area NRTA.

Referring to FIG. 10, the Y-touch electrode line Y-TEL positioned in the reference touch area RTA may be driven by the first sensing unit SU1 in a differential sensing scheme.

The first Y-touch electrode line Y-TEL-1 and the mth Y-touch electrode line Y-TEL-m positioned in the non-reference touch area NRTA may be electrically connected with the second sensing unit SU2.

The second sensing unit SU2 may output a signal Vout corresponding to a difference between the signal detected through the first Y-touch electrode line Y-TEL-1 and the signal detected through the mth Y-touch electrode line Y-TEL-m. Common noise between the first Y-touch electrode line Y-TEL-1 and the mth Y-touch electrode line Y-TEL-m may be removed.

Although the first Y-touch electrode line Y-TEL-1 and the mth Y-touch electrode line Y-TEL-m are not adjacent to each other, the noise of the first Y-touch electrode line Y-TEL-1 may be similar to that of the mth Y-touch electrode line Y-TEL-m.

For example, the gate driving circuit 120 may be positioned on each of two opposite sides of the active area AA. Alternatively, the gate driving circuit 120 may be positioned in an area adjacent to the non-active area NA in the active area AA. Parasitic capacitances formed between the line supplying a signal to the gate driving circuit 120 and the Y-touch electrode lines Y-TEL positioned on two opposite sides of the active area AA may be similar.

Alternatively, in some cases, data driving circuits 130 supplying the data voltage Vdata may be positioned on two opposite sides of the active area AA. In this case, display noise according to driving of the data driving circuit 130 may be similar.

Since the noise caused by circuits for display driving positioned on two opposite sides of the active area AA may be similar, it is possible to enhance the accuracy of touch sensing while removing common noise through differential sensing between the first Y-touch electrode line Y-TEL-1 and the mth Y-touch electrode line Y-TEL-m.

Further, since sensing through the touch sensing electrode line positioned in the non-reference touch area NRTA is performed separately from sensing through the touch sensing electrode line positioned in the reference touch area RTA, touch sensing may be performed while preventing or reducing signal distortion due to a difference in the unit touch sensor UTS.

Figure 11:
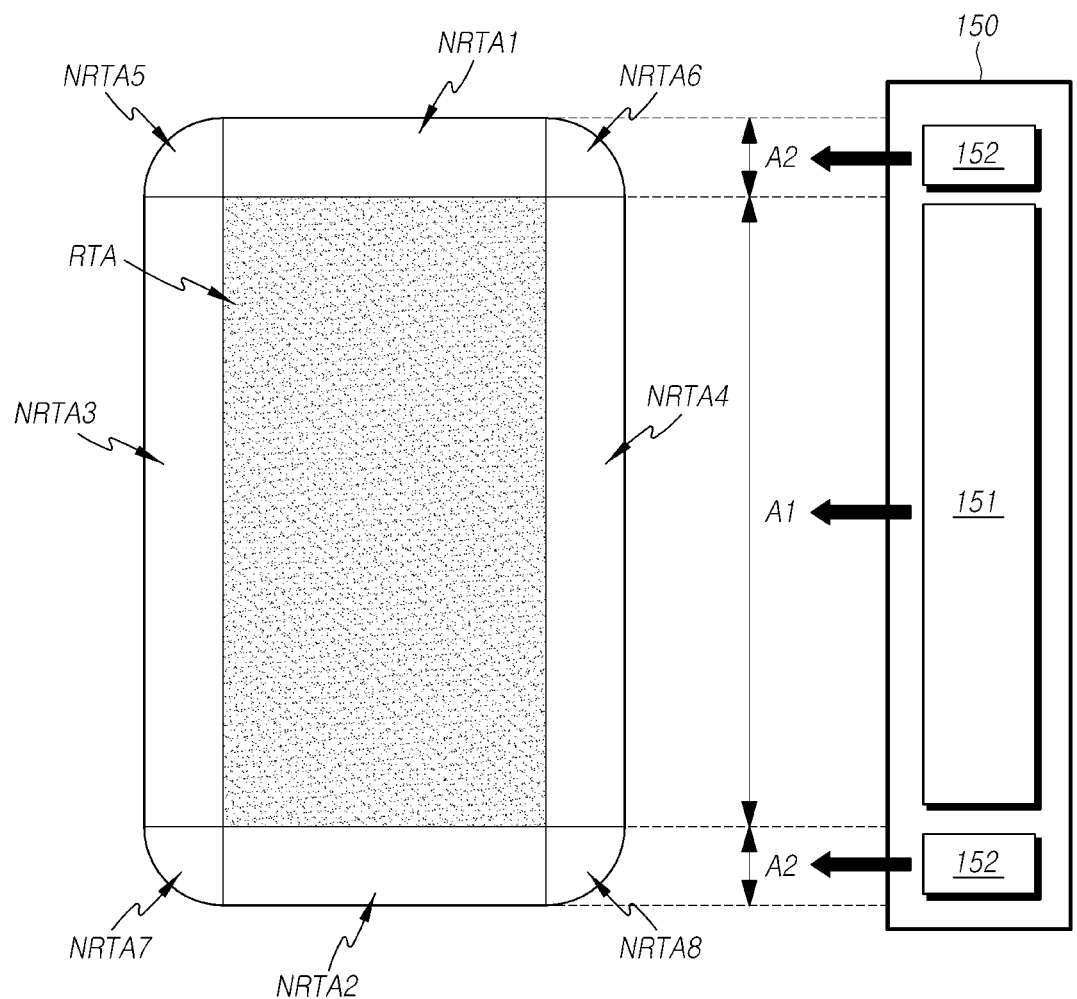
FIGS. 11 and 12 are views illustrating examples of a touch driving circuit for controlling driving or sensing of a touch electrode line performed for each of the divided areas shown in FIG. 6 according to embodiments of the disclosure.
Figure 12:
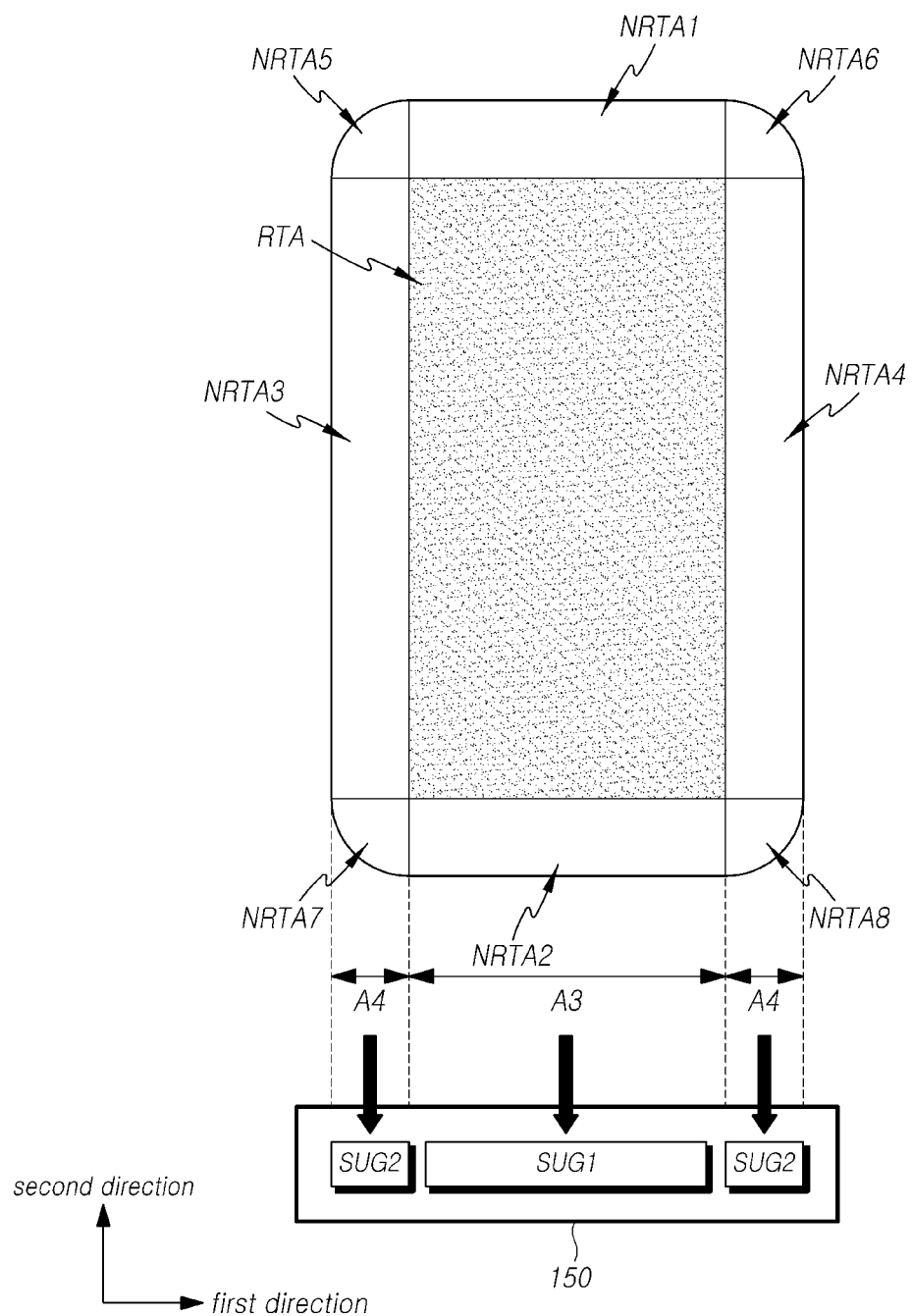

FIGS. 11 and 12 are views illustrating examples of a touch driving circuit 150 for controlling driving or sensing of a touch electrode line TEL performed for each of the divided areas shown in FIG. 6 in one embodiment.

Referring to FIG. 11, a touch driving circuit 150 may include a first driving unit 151 (e.g., a circuit) and a second driving unit 152 (e.g., a circuit).

For example, the first driving unit 151 may drive the touch driving electrode line positioned in the first area A1. For example, the second sensing unit 152 may drive the touch driving electrode line positioned in the second area A2.

The example shown in FIG. 11 illustrates a case where the X-touch electrode lines X-TEL electrically connected along the first direction are touch driving electrode lines, but in some cases, the Y-touch electrode lines Y-TEL electrically connected along the second direction may also be touch driving electrode lines.

The first area A1 may include a reference touch area RTA. A portion of the touch driving electrode line including a portion positioned in the reference touch area RTA may be positioned in the non-reference touch area NRTA.

Accordingly, the first area A1 may include a portion of the non-reference touch area NRTA. For example, the first area A1 may include a third non-reference touch area NRTA3 and a fourth non-reference touch area NRTA4.

The second area A2 may be an area other than the first area A1. The second area A2 may be an area that does not overlap the reference touch area RTA. The second area A2 may be an area where the touch driving electrode line not including the portion positioned in the reference touch area RTA is positioned.

The second area A2 may include a first non-reference touch area NRTA1, a second non-reference touch area NRTA2, a fifth non-reference touch area NRTA5, a sixth non-reference touch area NRTA6, a seventh non-reference touch area NRTA7, and an eighth non-reference touch area NRTA8 in one embodiment.

The first area A1 may be positioned between second areas A2. The reference touch area RTA may be positioned between the second areas A2.

The first driving unit 151 may simultaneously supply touch driving signals to two or more touch driving electrode lines among the plurality of touch driving electrode lines positioned in the first area A1. The phase of the touch driving signal supplied to at least one of the two or more touch driving electrode lines may be different from the phase of the touch driving signals supplied to the other touch driving electrode lines.

The second driving unit 152 may supply touch driving signals to a plurality of touch driving electrode lines positioned in the second area A2.

The second driving unit 152 may supply touch driving signals to the plurality of touch driving electrode lines positioned in the second area A2 during a period different from the period during which the first driving unit 151 supplies touch driving signals.

The second driving unit 152 may sequentially supply touch driving signals to the plurality of touch driving electrode lines positioned in the second area A2.

Alternatively, the second driving unit 152 may simultaneously supply touch driving signals to two or more touch driving electrode lines among the plurality of touch driving electrode lines positioned in the second area A2. The phases of touch driving signals simultaneously supplied to two or more touch driving electrode lines may be different.

As such, since the second driving unit 152 drives the touch driving electrode line positioned in the second area A2 independently of the first driving unit 151 in a period different from that of the first driving unit 151, it is possible to perform touch sensing while preventing or reducing signal distortion due to driving of the second area A2 different in the size of the unit touch sensor UTS.

Sensing units SU included in the touch driving circuit 150 and detecting touch sensing signals may also be divided depending on areas.

Referring to FIG. 12, the touch driving circuit 150 may include a first sensing unit group SUG1 (e.g., a circuit) and a second sensing unit group SUG2 (e.g., a circuit).

The first sensing unit group SUG1 may include a plurality of first sensing units SU1. The plurality of first sensing units SU1 may sense touch sensing electrode lines positioned in the third area A3.

The second sensing unit group SUG2 may include at least one second sensing unit SU2. At least one second sensing unit SU2 may sense the touch sensing electrode line positioned in the fourth area A4.

FIG. 12 illustrates an example where the Y-touch electrode lines Y-TEL electrically connected along the second direction are touch sensing electrode lines. In some cases, the X-touch electrode lines X-TEL electrically connected along the first direction may be touch sensing electrode lines.

The third area A3 may be an area where the touch sensing electrode line including a portion positioned in the reference touch area RTA is positioned. For example, the third area A3 may include a reference touch area RTA, a first non-reference touch area NRTA1, and a second non-reference touch area NRTA2.

The fourth area A4 may be an area other than the third area A3. The fourth region A4 may be an area where a touch-sensing electrode line not overlapping the third area A3 is positioned. The fourth area A4 may include a third non-reference touch area NRTA3, a fourth non-reference touch area NRTA4, a fifth non-reference touch area NRTA5, a sixth non-reference touch area NRTA6, a seventh non-reference touch area NRTA7, and an eighth non-reference touch area NRTA8 in one embodiment.

The third area A3 may be positioned between fourth areas A4. The reference touch area RTA may be positioned between fourth areas A4.

The plurality of first sensing units SU1 included in the first sensing unit group SUG1 may be electrically separated from touch sensing electrode lines positioned in the fourth area A4. At least one second sensing unit SU2 included in the second sensing unit group SUG2 may be electrically separated from the touch sensing electrode line positioned in the third area A3. The touch sensing electrode line positioned in the third area A3 and the touch sensing electrode line positioned in the fourth area A4 may be driven by separate sensing units SU.

The first sensing unit SU1 may drive the touch sensing electrode line positioned in the third area A3 in a differential sensing scheme. Touch sensing may be performed by detection of the signal from which common noise of the touch sensing electrode lines have been removed.

The second sensing unit SU2 may drive the touch sensing electrode lines positioned in the fourth area A4 with a single sensing scheme. Noise of the signal detected from the touch sensing electrode line positioned in the fourth area A4 may be removed during digital processing.

Alternatively, the second sensing unit SU2 may drive the touch sensing electrode line positioned in the fourth area A4 in a differential sensing scheme. Noise common to the touch sensing electrode lines positioned in the fourth area A4 may be removed.

Since the touch sensing electrode line positioned in the fourth area A4 is driven separately from the third area A3, signal distortion due to a difference between unit touch sensors UTS may be prevented or reduced.

Further, since differential sensing is performed between the touch sensing electrode lines in the fourth area A4 where the noise is similar due to the position where the circuit for driving the display is disposed, it is possible to perform touch sensing while reducing the noise of the signal detected from the touch sensing electrode line positioned in the fourth area A4.

The foregoing embodiments are briefly described below.

A touch display device 100 according to embodiments of the disclosure may comprise a substrate SUB including an active area AA and a non-active area NA positioned outside the active area AA, a plurality of light emitting elements ED on the substrate SUB, an encapsulation layer ENCAP on the plurality of light emitting elements ED, a plurality of touch driving electrode lines positioned on the encapsulation layer ENCAP and including two or more touch driving electrodes electrically connected along a first direction, and a plurality of touch sensing electrode lines positioned on the encapsulation layer ENCAP and including two or more touch sensing electrodes electrically connected along a second direction crossing the first direction. A unit touch sensor UTS may be defined by intersection of each of the plurality of touch driving electrode lines and each of the plurality of touch sensing electrode lines. The active area AA may include a reference touch area RTA and a non-reference touch area NRTA being different from each other in size of the unit touch sensor. At least one of a driving scheme for the touch driving electrode lines positioned in the non-reference touch area NRTA or a sensing scheme for the touch sensing electrode lines may be different from a driving scheme for the touch driving electrode lines, or a sensing scheme for the touch sensing electrode lines, including a portion positioned in the reference touch area RTA.

A touch driving signal may be simultaneously supplied to two or more touch driving electrode lines among the plurality of touch driving electrode lines including the portion positioned in the reference touch area RTA. A touch driving signal may be supplied to the plurality of touch driving electrode lines positioned in the non-reference touch area NRTA, during a period different from a period during which the touch driving signal is supplied to the plurality of touch driving electrode lines including the portion positioned in the reference touch area RTA.

A phase of the touch driving signal supplied to at least one of the two or more touch driving electrode lines to which the touch driving signal is simultaneously supplied and which includes the portion positioned in the reference touch area RTA may be different from a phase of the touch driving signal supplied to a rest of the two or more touch driving electrode lines.

The touch driving signal may be sequentially supplied to the plurality of touch driving electrode lines positioned in the non-reference touch area NRTA.

The touch driving signal may be simultaneously supplied to two or more touch driving electrode lines among the plurality of touch driving electrode lines positioned in the non-reference touch area NRTA. A phase of the touch driving signal supplied to at least one of the two or more touch driving electrode lines may be different from a phase of the touch driving signal supplied to a rest of the two or more touch driving electrode lines.

At least a portion of the reference touch area RTA may be positioned between the two or more touch driving electrode lines to which the touch driving signal is simultaneously supplied and which are positioned in the non-reference touch area NRTA.

At least two touch sensing electrode lines among the plurality of touch sensing electrode lines including the portion positioned in the reference touch area RTA may be electrically connected with the same sensing unit.

Each of the plurality of touch sensing electrode lines positioned in the non-reference touch area NRTA may be electrically connected with a separate sensing unit.

Or, at least two touch sensing electrode lines among the plurality of touch sensing electrode lines positioned in the non-reference touch area NRTA may be electrically connected with the same sensing unit.

The sensing unit electrically connected with the touch sensing electrode line in the non-reference touch area NRTA may be electrically separated from the touch sensing electrode line in the reference touch area RTA.

The at least two second electrodes including the portion positioned in the reference touch area RTA and electrically connected with the same sensing unit may be positioned adjacent to each other. At least one touch sensing electrode line may be positioned between the at least two touch sensing electrode lines positioned in the non-reference touch area NRTA and electrically connected with the same sensing unit.

At least a portion of the reference touch area RTA may be positioned between the at least two touch sensing electrode lines positioned in the non-reference touch area NRTA and electrically connected with the same sensing unit.

An amplitude of a touch driving signal supplied to the plurality of touch driving electrode lines including the portion positioned in the reference touch area RTA may be the same as an amplitude of a touch driving signal supplied to the plurality of touch driving electrode lines positioned in the non-reference touch area NRTA.

An area of the unit touch sensor UTS positioned in the reference touch area RTA may be larger than an area of the unit touch sensor UTS positioned in the non-reference touch area NRTA.

Areas of the unit touch sensors UTS positioned in the reference touch area RTA may be the same. Areas of at least two of the unit touch sensors UTS positioned in the non-reference touch area NRTA may be different.

A touch driving circuit 150 according to embodiments of the disclosure may comprise a first driving unit 151 driving a plurality of first touch driving electrode lines positioned in a first area and simultaneously supplying a touch driving signal to two or more first touch driving electrode lines among the plurality of first touch driving electrode lines and a second driving unit 152 supplying a touch driving signal to a plurality of second touch driving electrode lines positioned in a second area different from the first area during a period different from a period during which the touch driving signal is supplied to the plurality of first touch driving electrode lines. At least one of the plurality of first touch driving electrode lines may be positioned between the plurality of second touch driving electrode lines.

The second driving unit 152 may sequentially supply the touch driving signal to the plurality of second touch driving electrode lines.

The second driving unit 152 may simultaneously supply the touch driving signal to two or more second touch driving electrode lines among the plurality of second touch driving electrode lines. A phase of the touch driving signal supplied to at least one of the two or more second touch driving electrode lines may be different from a phase of the touch driving signal supplied to a rest of the two or more second touch driving electrode lines.

A touch driving circuit 150 according to embodiments of the disclosure may comprise a plurality of first sensing unit SU1s electrically connected with two or more first touch sensing electrode lines among a plurality of first touch sensing electrode lines positioned in a first area and at least one second sensing unit SU2 electrically connected with at least one of the plurality of second touch sensing electrode lines positioned in a second area different from the first area and electrically separated from the plurality of first touch sensing electrode lines.

The at least one second sensing unit SU2 may include a plurality of second sensing unit SU2 electrically connected with the plurality of second touch sensing electrode lines, respectively.

The at least one second sensing unit SU2s, respectively, may be electrically connected with two or more second touch sensing electrode lines among the plurality of second touch sensing electrode lines. At least one of the plurality of first touch sensing electrode lines may be positioned between the two or more second touch sensing electrode lines.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A touch display device, comprising:
a substrate including an active area and a non-active area positioned outside the active area, the active area including a reference touch area and a non-reference touch area;
a plurality of light emitting elements on the substrate;
an encapsulation layer on the plurality of light emitting elements;
a plurality of touch driving electrode lines on the encapsulation layer, the plurality of touch driving electrode lines including two or more touch driving electrodes electrically connected along a first direction; and
a plurality of touch sensing electrode lines on the encapsulation layer, the plurality of touch sensing electrode lines including two or more touch sensing electrodes electrically connected along a second direction that crosses the first direction,
wherein unit touch sensors are defined by intersections of the plurality of touch driving electrode lines and the plurality of touch sensing electrode lines, wherein a size of a unit touch sensor in the reference touch area is different from a size of a unit touch sensor in the non-reference touch area, and
wherein at least one of a driving scheme for the plurality of touch driving electrode lines in the non-reference touch area is different from a driving scheme for the plurality of touch driving electrode lines including a portion in the reference touch area, or a sensing scheme for the plurality of touch sensing electrode lines in the non-reference touch area is different from a sensing scheme for the plurality of touch sensing electrode lines including a portion in the reference touch area.

2. The touch display device of claim 1, wherein the driving scheme for the touch driving electrode lines including the portion in the reference touch area comprises simultaneously supplying touch driving signals to the plurality of touch driving electrode lines including the portion in the reference touch area during a first time period, and wherein the driving scheme for the touch driving electrode lines in the non-reference touch area comprises supplying a touch driving signal to the plurality of touch driving electrode lines in the non-reference touch area during a second time period that is different from the first time period.

3. The touch display device of claim 2, wherein a phase of a touch driving signal supplied to at least one of the plurality of touch driving electrode lines including the portion in the reference touch area is different from a phase of a touch driving signal supplied to remaining touch driving electrode lines including the portion in the reference touch area.

4. The touch display device of claim 2, wherein the driving scheme for the touch driving electrode lines in the non-reference touch area comprises sequentially supplying the touch driving signal to the plurality of touch driving electrode lines in the non-reference touch area.

5. The touch display device of claim 2, wherein the driving scheme for the touch driving electrode lines in the non-reference touch area comprises simultaneously supplying touch driving signals to the plurality of touch driving electrode lines in the non-reference touch area, and wherein a phase of a touch driving signal supplied to a first touch driving electrode line from the plurality of touch driving electrode lines in the non-reference touch area is different from a phase of a touch driving signal supplied to a second touch driving electrode line from the plurality of touch driving electrode lines in the non-reference touch area.

6. The touch display device of claim 5, wherein at least a portion of the reference touch area is between the first touch driving electrode line and the second touch driving electrode line that are in the non-reference touch area.

7. The touch display device of claim 1, wherein at least two touch sensing electrode lines from the plurality of touch sensing electrode lines including the portion in the reference touch area are electrically connected with a same sensing unit, and wherein each of the plurality of touch sensing electrode lines in the non-reference touch area are electrically connected with a corresponding one sensing unit.

8. The touch display device of claim 1, wherein at least two touch sensing electrode lines from the plurality of touch sensing electrode lines including the portion in the reference touch area are electrically connected to a first sensing unit, and wherein at least two touch sensing electrode lines from the plurality of touch sensing electrode lines in the non-reference touch area are electrically connected to a second sensing unit.

9. The touch display device of claim 8, wherein the second sensing unit connected to the at least two touch sensing electrode lines in the non-reference touch area is electrically separated from the first sensing unit connected to the at least two touch sensing electrode lines in the reference touch area.

10. The touch display device of claim 8, wherein the at least two sensing electrodes in the reference touch area that are connected with the first sensing unit are positioned adjacent to each other in the reference touch area, and wherein at least one touch sensing electrode line is between the at least two touch sensing electrode lines that are in the non-reference touch area and connected to the second sensing unit.

11. The touch display device of claim 8, wherein at least a portion of the reference touch area is between the at least two touch sensing electrode lines that are in the non-reference touch area and connected to the second sensing unit.

12. The touch display device of claim 1, wherein an amplitude of a touch driving signal supplied to the touch driving electrode lines including the portion in the reference touch area is a same as an amplitude of a touch driving signal supplied to the touch driving electrode lines in the non-reference touch area.

13. The touch display device of claim 1, wherein an area of the unit touch sensor in the reference touch area is greater than an area of the unit touch sensor positioned in the non-reference touch area.

14. The touch display device of claim 1, wherein areas of unit touch sensors in the reference touch area are a same, and areas of at least two unit touch sensors in the non-reference touch area are different from each other.

15. A touch driving circuit, comprising:
a first driving unit configured to simultaneously supply a touch driving signal to two or more first touch driving electrode lines from a plurality of first touch driving electrode lines during a first time period, a portion of the plurality of first touch driving electrode lines in a first area of a display panel; and
a second driving unit configured to supply a touch driving signal to a plurality of second touch driving electrode lines that are in a second area of the display panel but not the first area where the second area is around the first area, the touch driving signal supplied to the plurality of second touch driving electrode lines during a second time period that is different from the first time period,
wherein at least one of the plurality of first touch driving electrode lines in the first area is between the plurality of second touch driving electrode lines in the second area.

16. The touch driving circuit of claim 15, wherein the second driving unit is configured to sequentially supply the touch driving signal to the plurality of second touch driving electrode lines.

17. The touch driving circuit of claim 15, wherein the second driving unit is configured to simultaneously supply touch driving signals to two or more second touch driving electrode lines from the plurality of second touch driving electrode lines,
wherein a phase of a touch driving signal supplied to at least one of the two or more second touch driving electrode lines is different from a phase of a touch driving signal supplied to another one of the two or more touch driving electrode lines.

18. The touch driving circuit of claim 15, further comprising:
a plurality of first sensing units, each of the plurality of first sensing units electrically connected with at least two first touch sensing electrode lines from the plurality of first touch sensing electrode lines; and
a plurality of second sensing units, each of the plurality of second sensing units electrically connected with at least one of the plurality of second touch sensing electrode lines that is electrically separated from the plurality of first touch sensing electrode lines.

19. The touch driving circuit of claim 18, wherein each of the plurality of second sensing units is electrically connected with a corresponding one second touch sensing electrode line from the plurality of second touch sensing electrode lines.

20. The touch driving circuit of claim 18, wherein at least one second sensing unit from the plurality of second sensing units is electrically connected to at least two second touch sensing electrode lines from the plurality of second touch sensing electrode lines, and at least one of the plurality of first touch sensing electrode lines is between the at least two second touch sensing electrode lines.

21. A touch display device comprising:
a display panel including:
a substrate comprising an active area and a non-active area around the active area, the active area having a first area and a second area around the first area;
a plurality of light emitting elements on the active area of the substrate;
a plurality of first touch driving electrode lines in the first area and the second area, the plurality of first touch driving electrode lines extending along a first direction; and
a plurality of second touch driving electrode lines in the second area but not the first area, the plurality of second touch driving electrode lines extending along the first direction; and
a touch driving circuit configured to supply first touch driving signals to the plurality of first touch driving electrode lines during a first time period and supply second touch driving signals to the plurality of second touch driving electrode lines during a second time period that is non-overlapping with the first time period.

22. The touch display device of claim 21, wherein the touch driving circuit is configured to simultaneously supply the first touch driving signals to the plurality of first touch driving electrode lines during first time period, and a phase of one of the first touch driving signals supplied to one of the plurality of first touch driving electrode lines is different from a phase of remaining first touch driving signals supplied to remaining first touch driving electrode lines from the plurality of first touch driving electrode lines, and
wherein the touch driving circuit is configured to sequentially supply the second touch driving signals to the plurality of second touch driving electrode lines during second time period.

23. The touch display device of claim 21, wherein the touch driving circuit is configured to simultaneously supply the first touch driving signals to the plurality of first touch driving electrode lines during first time period, and a phase of one of the first touch driving signals supplied to one of the plurality of first touch driving electrode lines is different from a phase of remaining first touch driving signals supplied to remaining first touch driving electrode lines from the plurality of first touch driving electrode lines, and
wherein the touch driving circuit is configured to simultaneously supply the second touch driving signals to the plurality of second touch driving electrode lines during second time period, and a phase of one of the second touch driving signals supplied to one of the plurality of second touch driving electrode lines is different from a phase of remaining second touch driving signals supplied to remaining second touch driving electrode lines from the plurality of second touch driving electrode lines.

24. The touch display device of claim 21, further comprising:
a plurality of first touch sensing electrode lines disposed in the first area and the second area, the plurality of first touch electrode sensing lines extending along a second direction that is different from the first direction; and
a plurality of second touch sensing electrode lines disposed in the second area but not the first area, the plurality of second touch sensing electrode lines extending along the second direction.

25. The touch display device of claim 24, wherein the touch driving circuit comprises:
a plurality of first sensing units, each of the plurality of first sensing units connected to a pair of first touch sensing electrode lines from the plurality of first touch sensing electrode lines; and
a plurality of second sensing units, each of the plurality of first sensing units connected to a corresponding one second touch sensing electrode line from the plurality of first touch sensing electrode lines.

26. The touch display device of claim 24, wherein the touch driving circuit comprises:
a plurality of first sensing units, each of the plurality of first sensing units connected to a pair of first touch sensing electrode lines from the plurality of first touch sensing electrode lines; and
a second sensing unit connected to a pair of second touch sensing electrode lines from the plurality of second touch sensing electrode lines,
wherein at least one first touch sensing electrode line is between the pair of second touch sensing electrode lines.

27. The touch display device of claim 23, wherein a first unit touch sensor located at an intersection of a first touch driving electrode line from the plurality of first touch driving electrodes and a first touch sensing electrode line from the plurality of second touch driving electrode lines is larger than a second unit touch sensor located at an intersection of a second touch driving electrode line from the plurality of second touch driving electrodes and a second touch sensing electrode line from the plurality of second touch driving electrode lines.

* * * * *